(12) United States Patent
Maeda et al.

(10) Patent No.: US 7,372,503 B2
(45) Date of Patent: May 13, 2008

(54) IMAGING APPARATUS

(75) Inventors: Haruo Maeda, Tsushima (JP);
Kazuhiro Sukenari, Nagoya (JP);
Hiroshi Yamakose, Gifu (JP)

(73) Assignee: Elmo Company Limited (JP)

( * ) Notice: Subject to any disclaimer, the term of this patent is extended or adjusted under 35 U.S.C. 154(b) by 633 days.

(21) Appl. No.: 10/234,563

(22) Filed: Sep. 3, 2002

(65) Prior Publication Data
US 2003/0133013 A1 Jul. 17, 2003

(30) Foreign Application Priority Data
Jan. 15, 2002 (JP) ............................. 2002-006156

(51) Int. Cl.
*H04N 5/225* (2006.01)
*F16M 11/02* (2006.01)
*A45F 3/00* (2006.01)

(52) U.S. Cl. .................. 348/376; 248/177.1; 190/11
(58) Field of Classification Search ............... 348/143, 348/373, 376; 360/73.03; 396/428; 190/11; 248/177.1
See application file for complete search history.

(56) References Cited

U.S. PATENT DOCUMENTS

| | | | |
|---|---|---|---|
| 4,825,295 A | | 4/1989 | Ishikawa et al. |
| 4,856,627 A | * | 8/1989 | Polatov ........................ 190/11 |
| 5,579,071 A | * | 11/1996 | Wetzel et al. ............... 396/428 |
| 5,751,355 A | * | 5/1998 | Bito et al. .................... 348/375 |
| 5,754,355 A | * | 5/1998 | Nakamura et al. ........ 360/73.03 |
| 6,454,064 B1 | * | 9/2002 | Cheng ......................... 190/11 |
| 6,604,720 B1 | * | 8/2003 | Wilson ....................... 248/177.1 |

FOREIGN PATENT DOCUMENTS

| | | |
|---|---|---|
| CN | 2117068 A | 9/1999 |
| DE | 2155980 | 5/1973 |
| DE | 44 18 237 | 12/1994 |
| JP | 6-141141 | 5/1994 |
| JP | 11-122605 A | 4/1999 |

OTHER PUBLICATIONS

German Office Action issued Oct. 12, 2007 with English language translation in counterpart German application.
German Office Action issued Apr. 24, 2007 with English language translation.

* cited by examiner

*Primary Examiner*—Gims Philippe
(74) *Attorney, Agent, or Firm*—Ostrolenk, Faber, Gerb & Soffen, LLP

(57) ABSTRACT

A camera-assisted presentation apparatus, which is one of imaging apparatuses, has a table including a fixation member and two extension members, and a camera support assembly with a video camera attached to one end thereof. The two extension members are attached to the fixation member in a pivotally rotatable manner. In a service state of the camera-assisted presentation apparatus, the fixation member and the two extension members are extended to form one identical plane and ensure a wide area, on which a material for presentation is mounted. In a non-service state of the camera-assisted presentation apparatus, the two extension members are folded down to a camera holder member and an arm member of the camera support assembly. This arrangement significantly reduces the whole size of the camera-assisted presentation apparatus in its non-service state and effectively enhances the portability of the camera-assisted presentation apparatus.

22 Claims, 18 Drawing Sheets

IMAGING APPARATUS

BACKGROUND OF THE INVENTION

1. Field of the Invention

The present invention relates to an imaging apparatus, and more specifically pertains to an imaging apparatus having a table, on which an object to be imaged is mounted, and a video camera that faces the table in an imaging direction.

2. Description of the Related Art

A camera-assisted presentation system including a video camera and displaying an image of a material on a monitor television is one known example of imaging apparatuses. The imaging apparatus has a table on which a material to be imaged, such as a document or a photograph, is mounted, and a video camera located above a center portion of the table. The video camera is attached to a post, which is fixed to the table or is folded down in a non-service state and pulled up in a service state.

In the imaging apparatus, the vide camera is provided with a zoom lens for zooming the imaged material or expanding the imaging range. The imaging range may be varied manually or automatically.

The prior art imaging apparatus has a large table, on which the material is mounted. This leads to poor portability of the imaging apparatus. The material to be imaged typically has a size of A4 or greater, and the table accordingly has the size of A4 or greater. Size reduction of the imaging apparatus has highly been demanded with recent size reduction of a liquid crystal projector or a micro mirror device (DMD) projector, which is often combined with the imaging apparatus.

One proposed technique for size reduction of the imaging apparatus in the folded state omits the table and uses legs to support the post with the video camera attached thereto. This technique, however, has a problem that the imaging range is unclear. The required area of the material may thus not be imaged adequately, or it may take an undesirably long time for presentation of the material. Size reduction of the imaging apparatus with a table has accordingly been required.

SUMMARY OF THE INVENTION

The object of the present invention is thus to solve the problem of the prior art technique described above and to reduce the total size of the imaging apparatus with a table, on which a material is mounted, thus enhancing portability of the imaging apparatus.

In order to attain at least part of the above and the other related objects, the present invention is directed to An imaging apparatus comprising: a table, on which an object to be imaged is mounted; a video camera that faces said table in an imaging direction; and a video camera support member that holds the video camera, which is attached to one end of the video camera support member, at a specific position for imaging the table. The table occupies a smaller space in a non-service state of the imaging apparatus than a space in a service state of the imaging apparatus.

In the imaging apparatus of the present invention, the table occupies the smaller space in the non-service state of the imaging apparatus, compared with the space occupied in the service state of the imaging apparatus. This arrangement significantly reduces the total size of the imaging apparatus and effectively enhances the portability of the imaging apparatus. A diversity of designs are applicable to such structure that the table occupies the smaller space in the non-service state of the imaging apparatus than the space in the service state of the imaging apparatus. In one preferable modification, the table is surface treated to have a specific surface area representing a place in which a material of a predetermined size is to be located. This clarifies the place in which the material is to be located in the imaging apparatus.

The above and other objects, features, aspects, and advantages of the present invention will become more apparent from the following detailed description of the preferred embodiments with the accompanying drawings.

DESCRIPTION OF THE PREFERRED EMBODIMENTS

Figure 1:
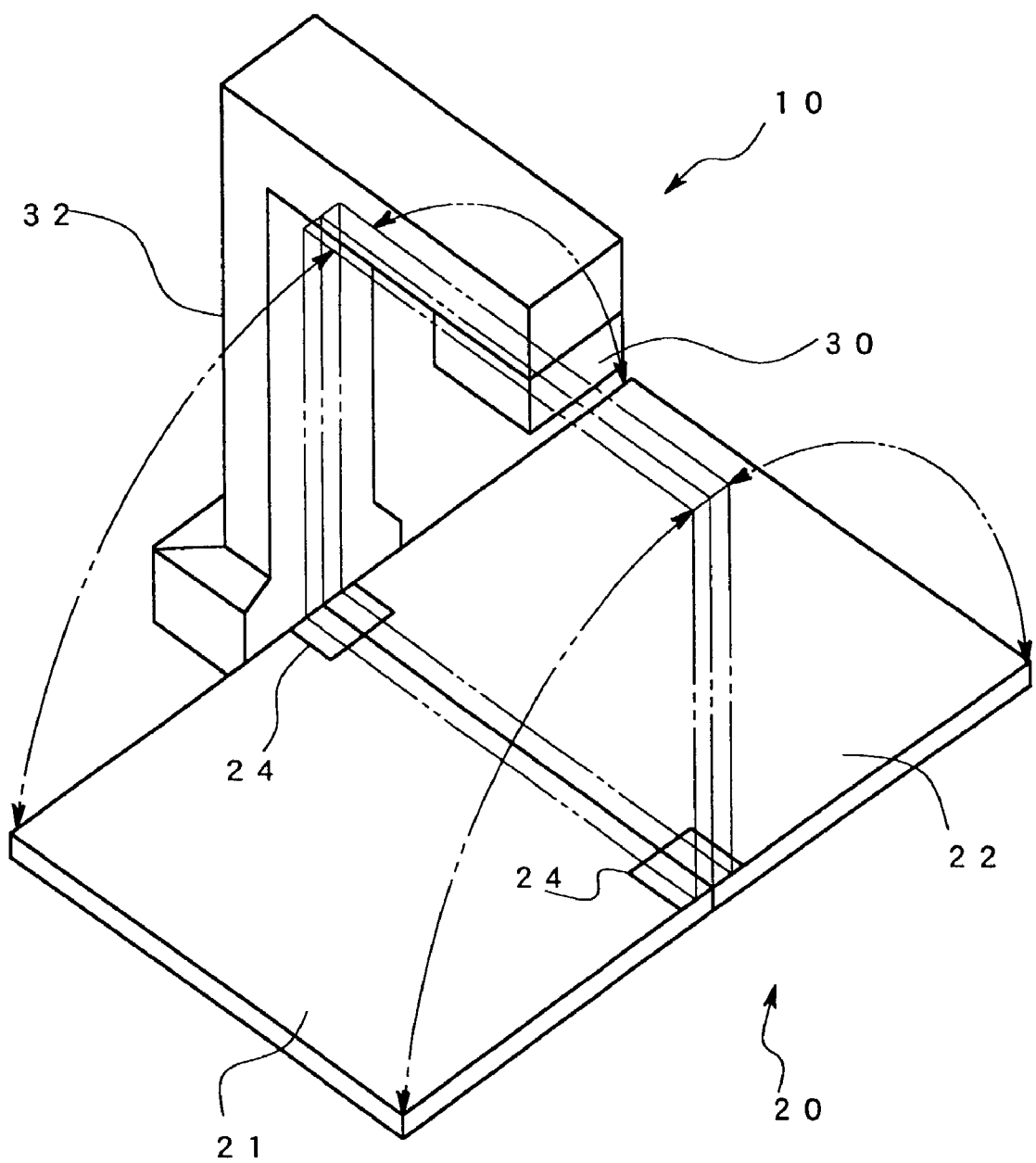
FIG. 1 is a perspective view illustrating an imaging apparatus in one mode of carrying out the invention.

An imaging apparatus 10 in one mode of carrying out the present invention includes a table 20 and a video camera 30 as shown in FIG. 1. The table 20 has two members 21 and 22, which are joined with each other by means of hinges 24. A post 32 for supporting the video camera 30 is extended upright from one end of the joint of the members 21 and 22. The post 32 has a base of a greater bottom area, in which a heavy weight is embedded. The post 32 with the video camera 32 attached thereto is accordingly self sustained. A shaft of the hinges 24 for joining the two members 21 and 22 with each other is fixed to the base of the post 32. The two members 21 and 22 are folded down in a non-service state of the imaging apparatus 10 as shown by the two-dot chain line in FIG. 1. This arrangement thus reduces the total size of the imaging apparatus 10 in the non-service state, compared with the size in a service state, thus enhancing the portability of the imaging apparatus 10.

The table 20 may have three or a greater number of members. For example, like an imaging apparatus 11 shown in FIG. 2, the table may include three members 41, 42, and 43, which are joined with one another by means of hinges and are foldable. In another example, each of the two members 21 and 22 may have two sub-members, and the four sub-members may be folded down. The positional relationship between the post 32 and the table 20 is not fixed. In the imaging apparatus 10 shown in FIG. 1, the post 32 is located on a substantial centerline of the table 20. In another example, the post 32 is located on one end of the table 20 (that is, on the side of either one of the two members 21 and 22) like an imaging apparatus 12 shown in FIG. 3. The size of the imaging apparatus for storage depends upon the structure of folding down the table 20 relative to the post 32 with the video camera 30 attached thereto. Any folding structure reduces the dimensions of the table 20 for storage, thus attaining size reduction of the imaging apparatus and enhancing the portability of the imaging apparatus.

Figure 2:
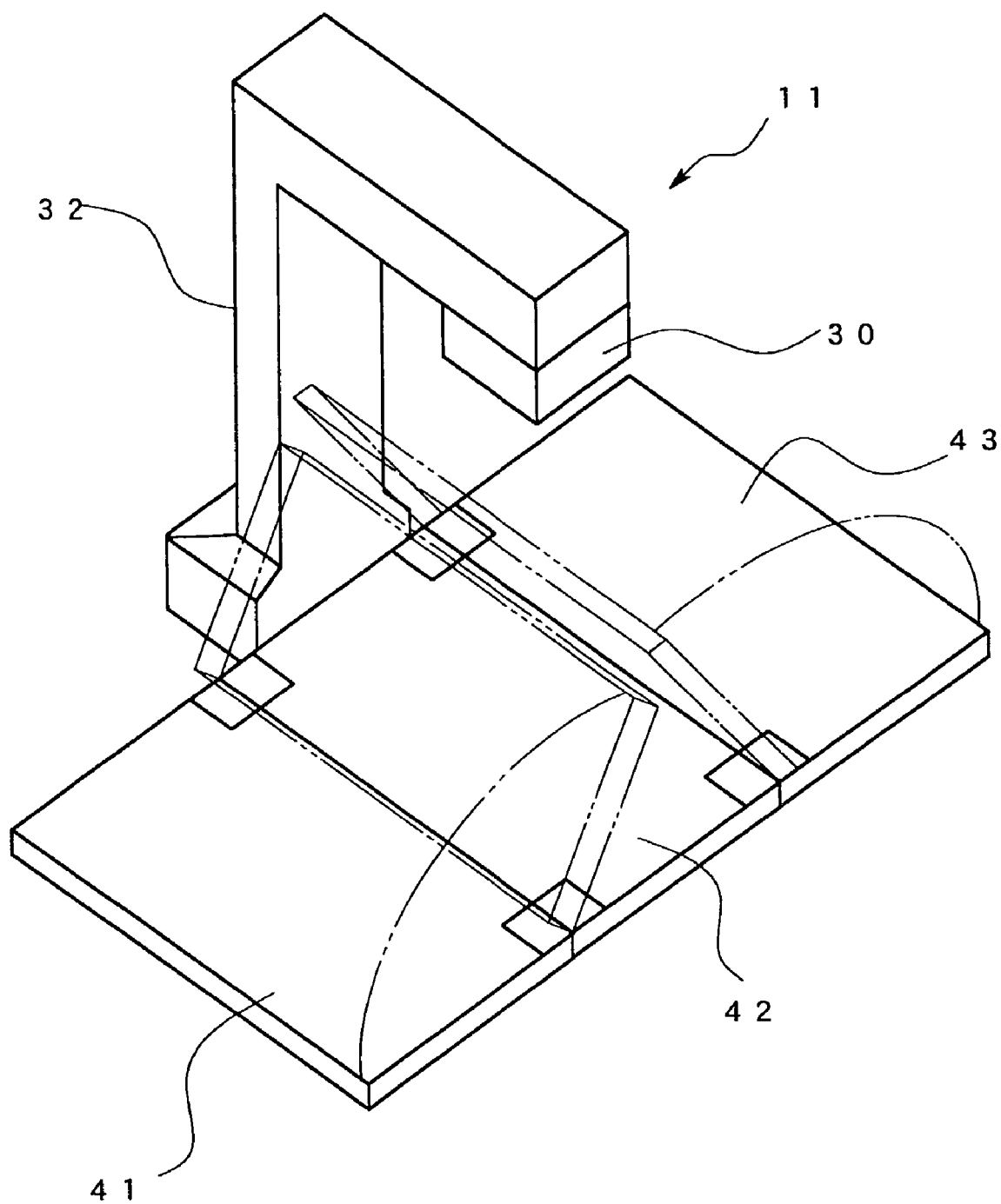
FIG. 2 is a perspective view illustrating another imaging apparatus in another mode of carrying out the invention.
Figure 3:
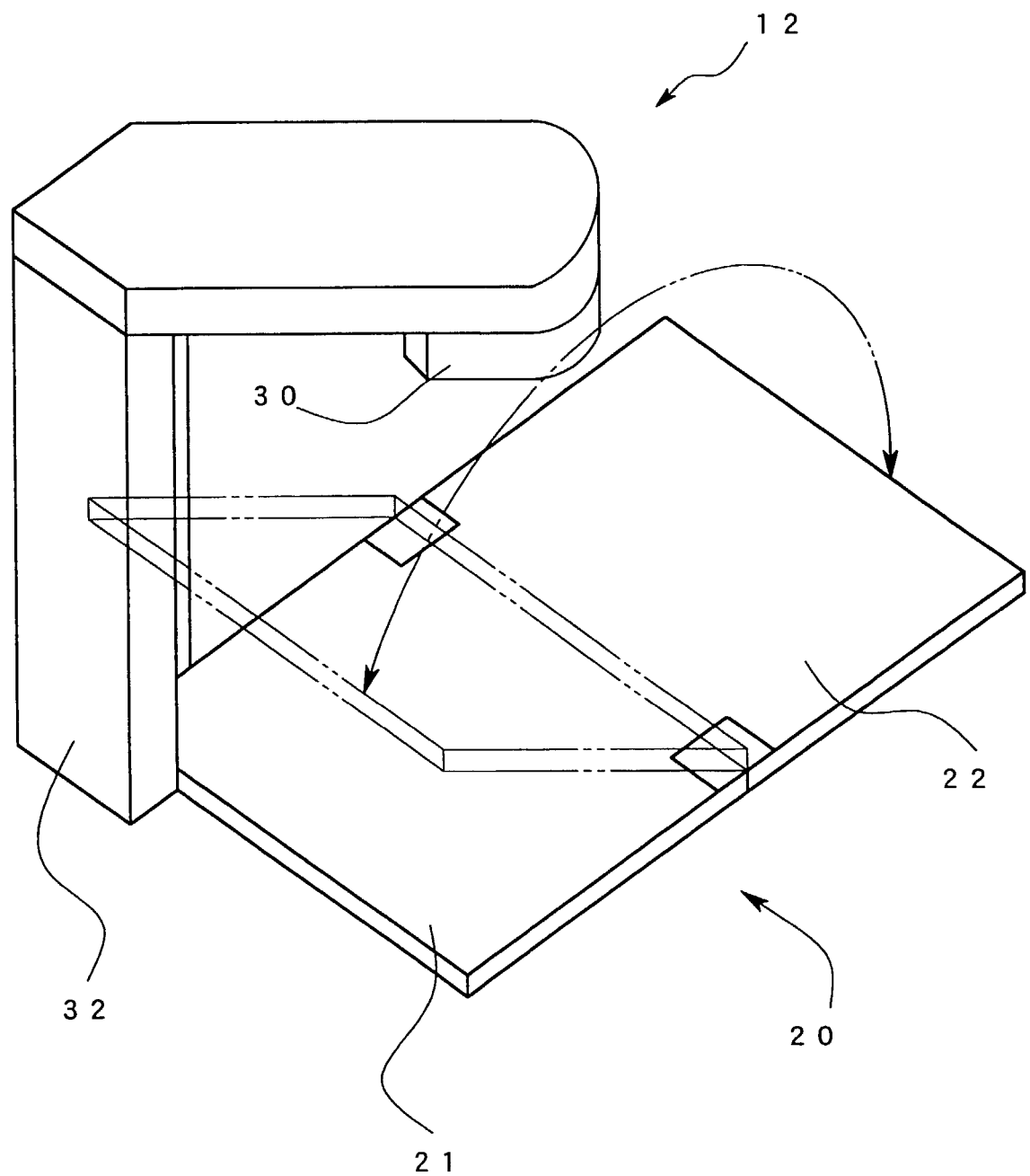
FIG. 3 is a perspective view illustrating still another imaging apparatus in still another mode of carrying out the invention.

As shown in FIGS. 1 and 2, the two members 21 and 22 or the three members 41, 42, and 43 have a substantially identical area. Overlapping these members efficiently attains size reduction of the imaging apparatus in storage. One of the members may have a greater area than the others according to other factors for storage.

Figure 4:
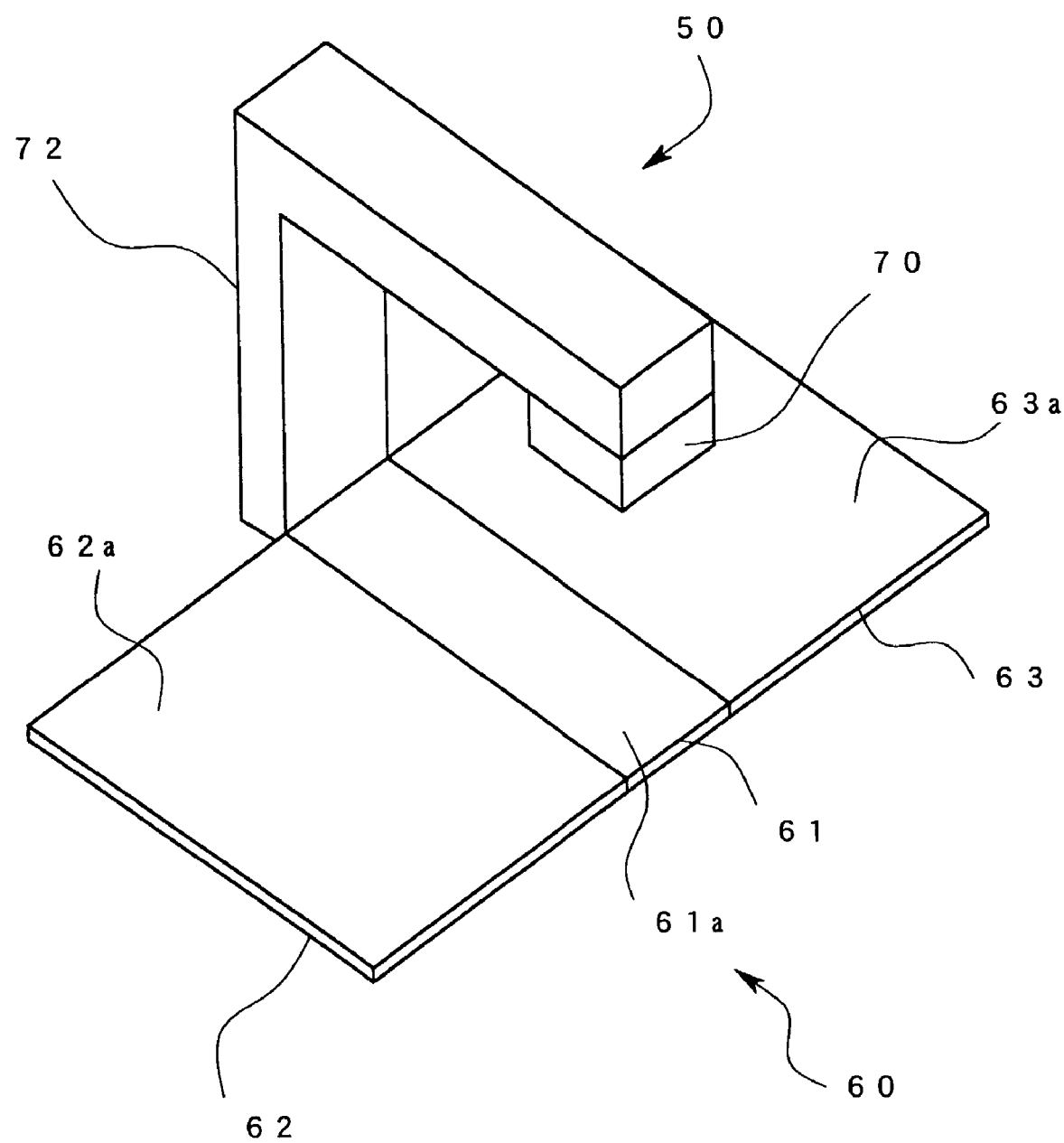
FIG. 4 is a perspective view illustrating another imaging apparatus in another mode of carrying out the invention.

FIG. 4 shows another imaging apparatus 50 in another mode of carrying out the invention. The imaging apparatus 50 has a table 60, a video camera 70, and a video camera support member 72 supporting the video camera 70 attached thereto. The table 60 includes a fixation member 61 having a substantially equal width to a width of the video camera support member 72, and two extension members 62 and 63 attached to either side of the fixation member 61 in a pivotally rotatable manner. The video camera support member 72 is fixed to one end of the fixation member 61. In this mode, the video camera support member 72 fixed to the fixation member 72 is self sustained. The fixation member 61 and the extension members 62 and 63 of the table 60 respectively have synthetic resin surface elements 61a, 62a, and 63a having a thickness of approximately 5 mm. Reinforcing metal plates 62b and 63b (see FIG. 5) are fixed to the rear faces of the surface elements 62a and 63a. The metal plates 62b and 63b are slightly concaved for the high strength as illustrated.

Figure 5:
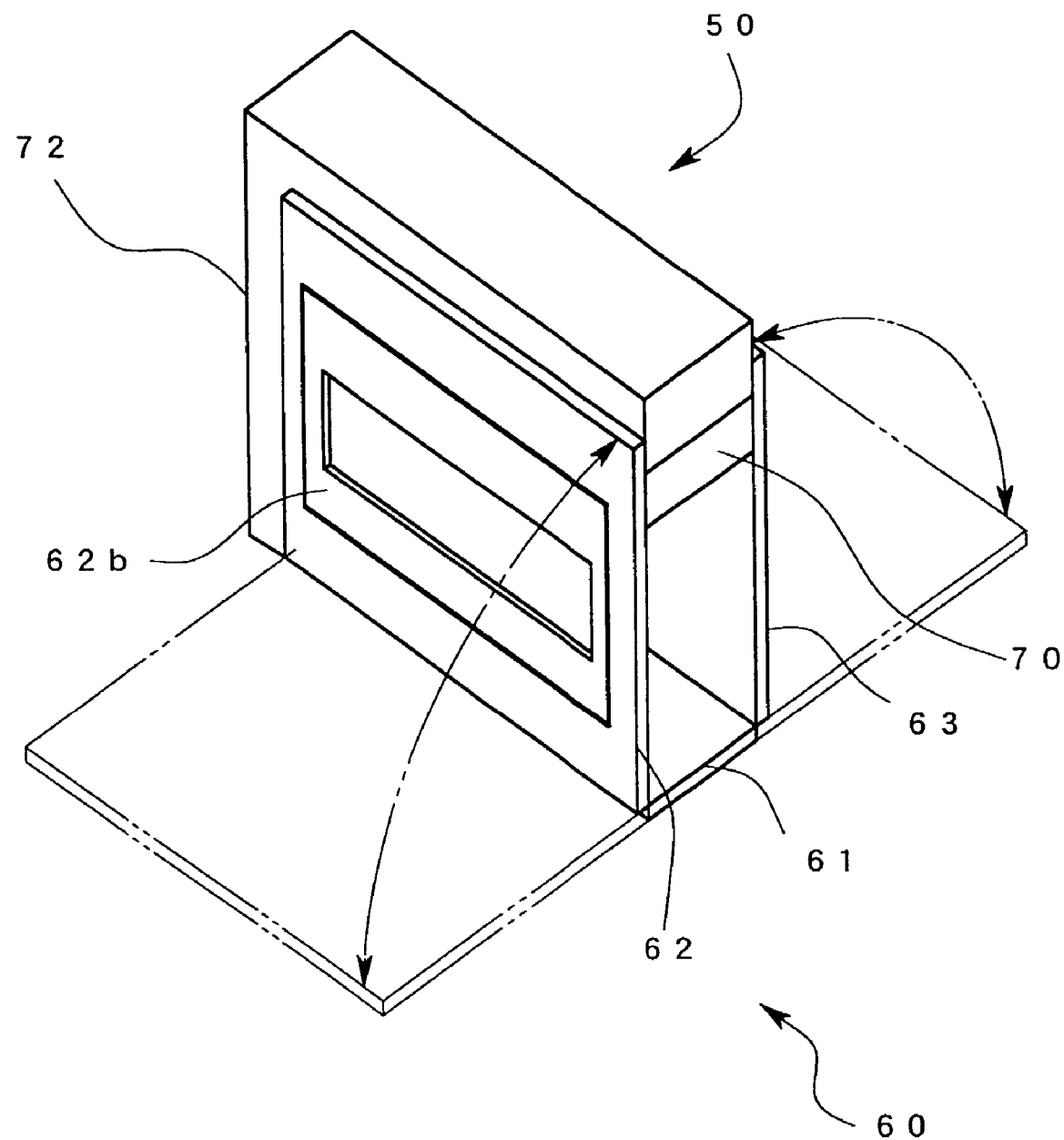
FIG. 5 is a perspective view illustrating the imaging apparatus of FIG. 4 in storage.

In the non-service state of the imaging apparatus 50, the two extension members 62 and 63 are folded down to the video camera support member 72 as shown in FIG. 5. This arrangement reduces the size of the imaging apparatus 50 to the size of the extension members 62 and 63 and significantly enhances the portability of the imaging apparatus 50. The video camera 70 is received in the U-shaped space defined by the video camera support member 72, the fixation member 61, and the extension members 62 and 63. The resulting shape in the non-service state of the imaging apparatus 50 is a quasi rectangular solid and is extremely convenient for accommodation in a bag or the like. This arrangement also enhances the safety of the video camera 70 in storage. In the service state of the imaging apparatus 50, the two extension members 62 and 63 are rotated relative to the fixation member 61 and reach a specific position to form an identical plane with the fixation member 61. Namely in the service state of the imaging apparatus 50, the two extension members 62 and 63 and the fixation member 61 form the table 60 of a relatively large area (for example, the size of A4 or greater), on which a material to be imaged is mounted.

Figure 6:
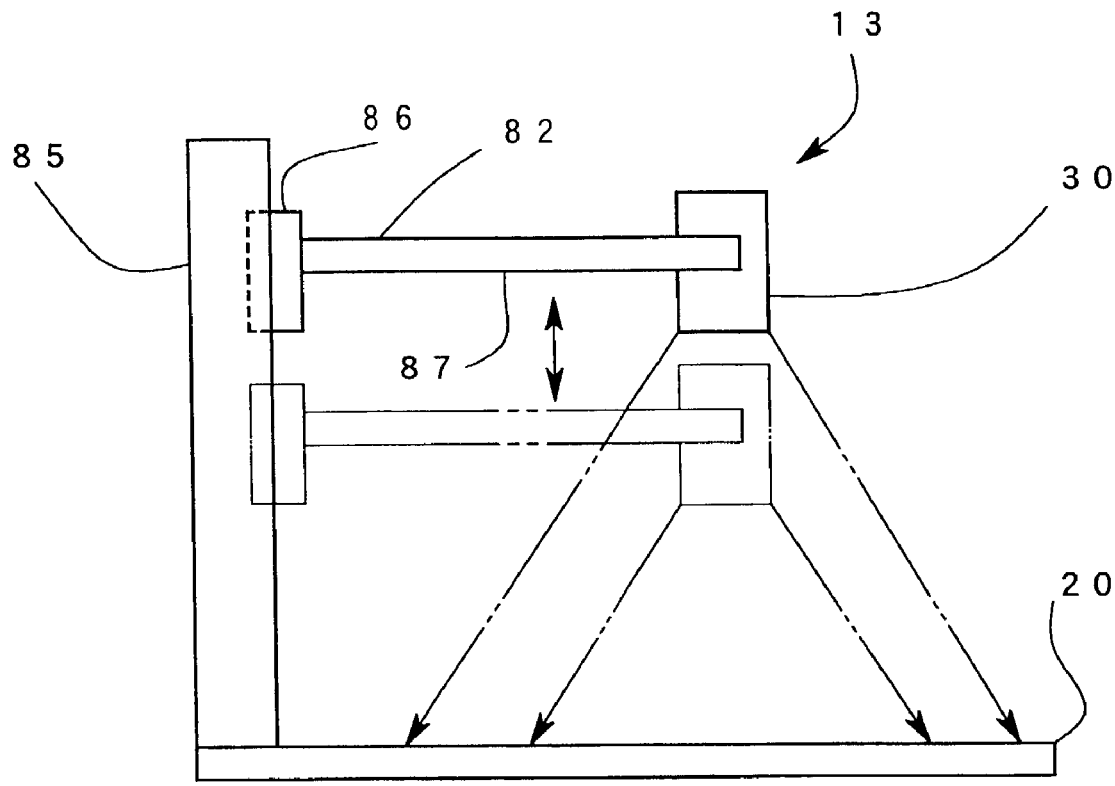
FIG. 6 shows one mechanism of vertically moving a video camera.

The video camera 30 or 70 may have a zoom function to expand the imaging range. The zoom function enhances the performances of the imaging apparatus 10 or 50. The zoom function is readily attained by incorporating a manual or power-driven zoom lens in the video camera. When the video camera 30 or 70 is a CCD camera with a monofocal lens, the zoom function is attained by varying the distance between the video camera and the table. The CCD camera with the monofocal lens has a large focal depth and ensures a focalized image over a wide range. For example, in an imaging apparatus 13 schematically illustrated in FIG. 6, a video camera support member 82 includes a post 85, a slider 86 sliding relative to the post 85, and an arm 87 having one end fixed to the slider 86 and the other end holding the video camera 30 attached thereto. The structure enables the video camera 30 to be shifted relative to the table 20 between at least two different positions. This arrangement readily attains the zoom function without any focalizing operation. The distance between the video camera 30 and the table 20 may be adjustable in multiple stages.

Figure 7:
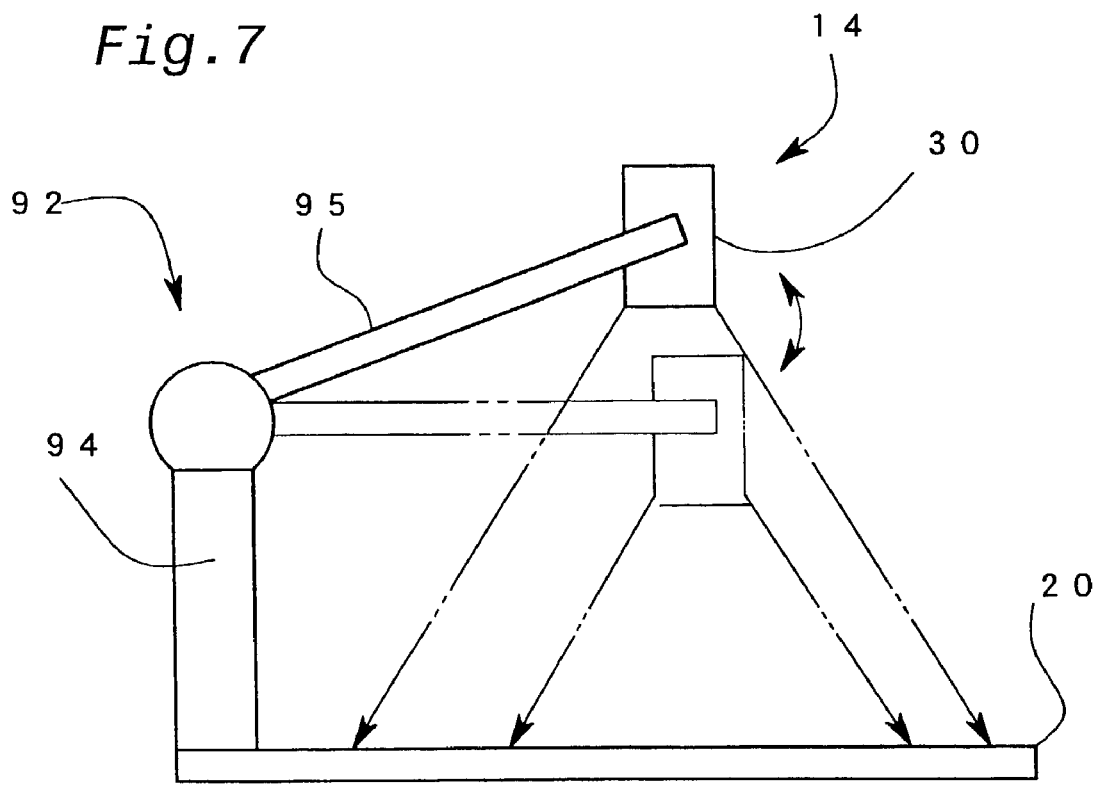
FIG. 7 shows another mechanism of vertically moving the video camera.
Figure 8:
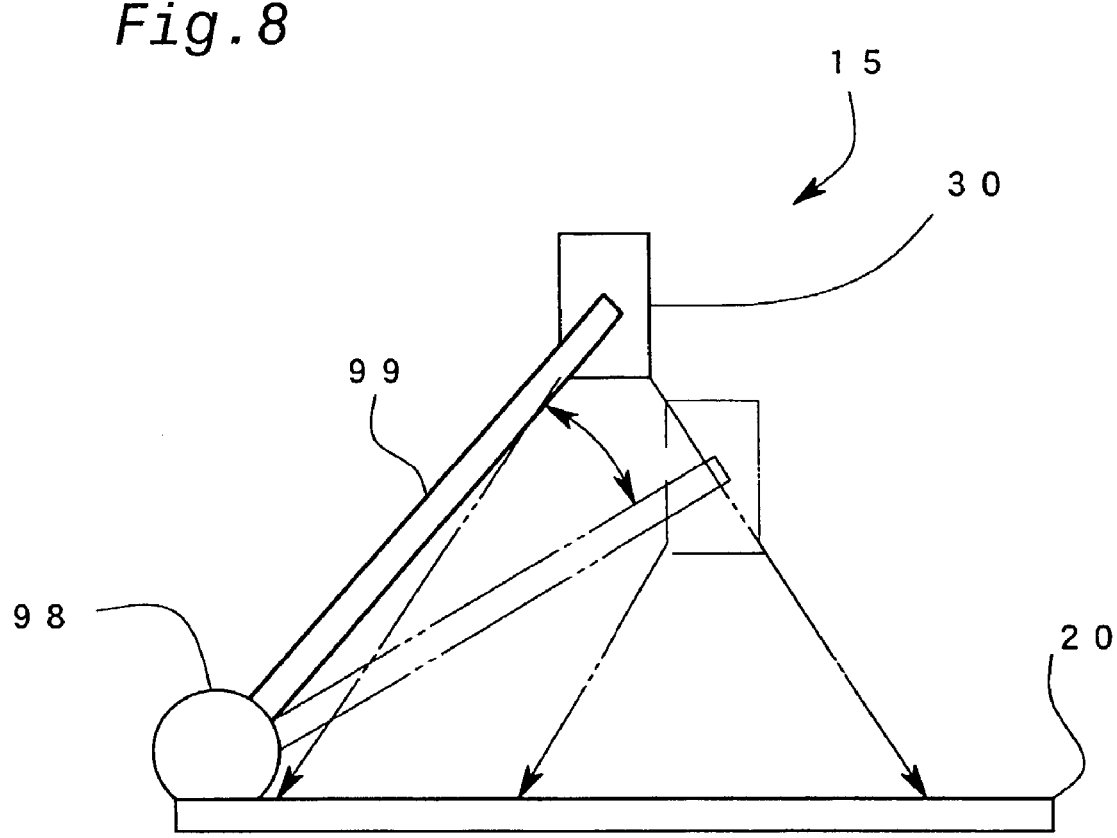
FIG. 8 shows still another mechanism of vertically moving the video camera.

A diversity of mechanisms are applicable to vary the distance between the video camera 30 and the table 20. For example, in an imaging apparatus 14 schematically illustrated in FIG. 7, a video camera support member 92 includes two members 94 and 95. One member 94 is used as a camera fixation member for fixing the video camera 30, and the other member 95 is used as a movable member that is coupled with the camera fixation member 94 and is moved to vary the distance between the video camera 30 and the table 20. In another imaging apparatus 15 schematically illustrated in FIG. 8, the movable member is an arm member 99 that pivotally rotates about a hinge 98 disposed at a predetermined position of the table 20, for example, at one end of the table 20.

Figure 9:
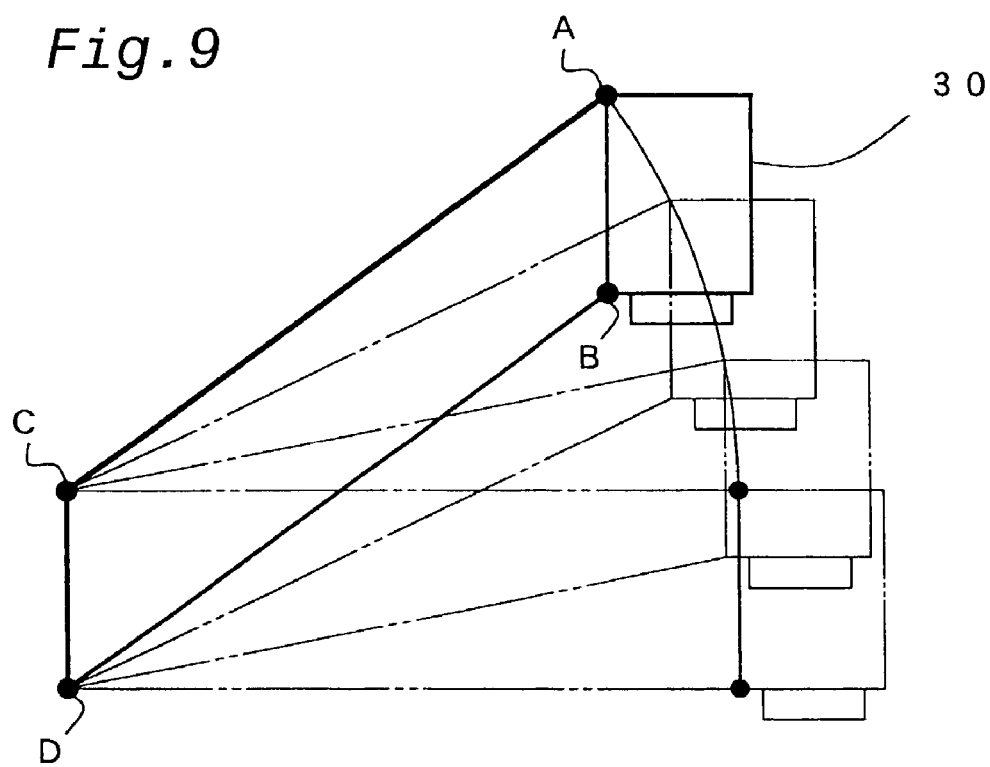
FIG. 9 shows the principle of a link mechanism of varying the height of the video camera while holding the attitude of the video camera.

As described above, in the structure of using a pivotally rotating arm to vary the distance between the video camera 30 and the table 20, it is preferable that the imaging apparatus has an attitude holding mechanism that holds an attitude of the video camera 30 relative to the table 20. This example is schematically shown in FIG. 9. FIG. 9 shows the principle of a link mechanism built in the arm 99 in the structure of FIG. 8. The link mechanism has a known structure, where a parallelogram link keeps a side AB holding the video camera 30 attached thereto in parallel with a fixed side CD even when the height of the video camera 30 is varied. This arrangement does not require manual adjustment of the attitude of the video camera 30 in the process of varying the height of the video camera 30.

Figure 10:
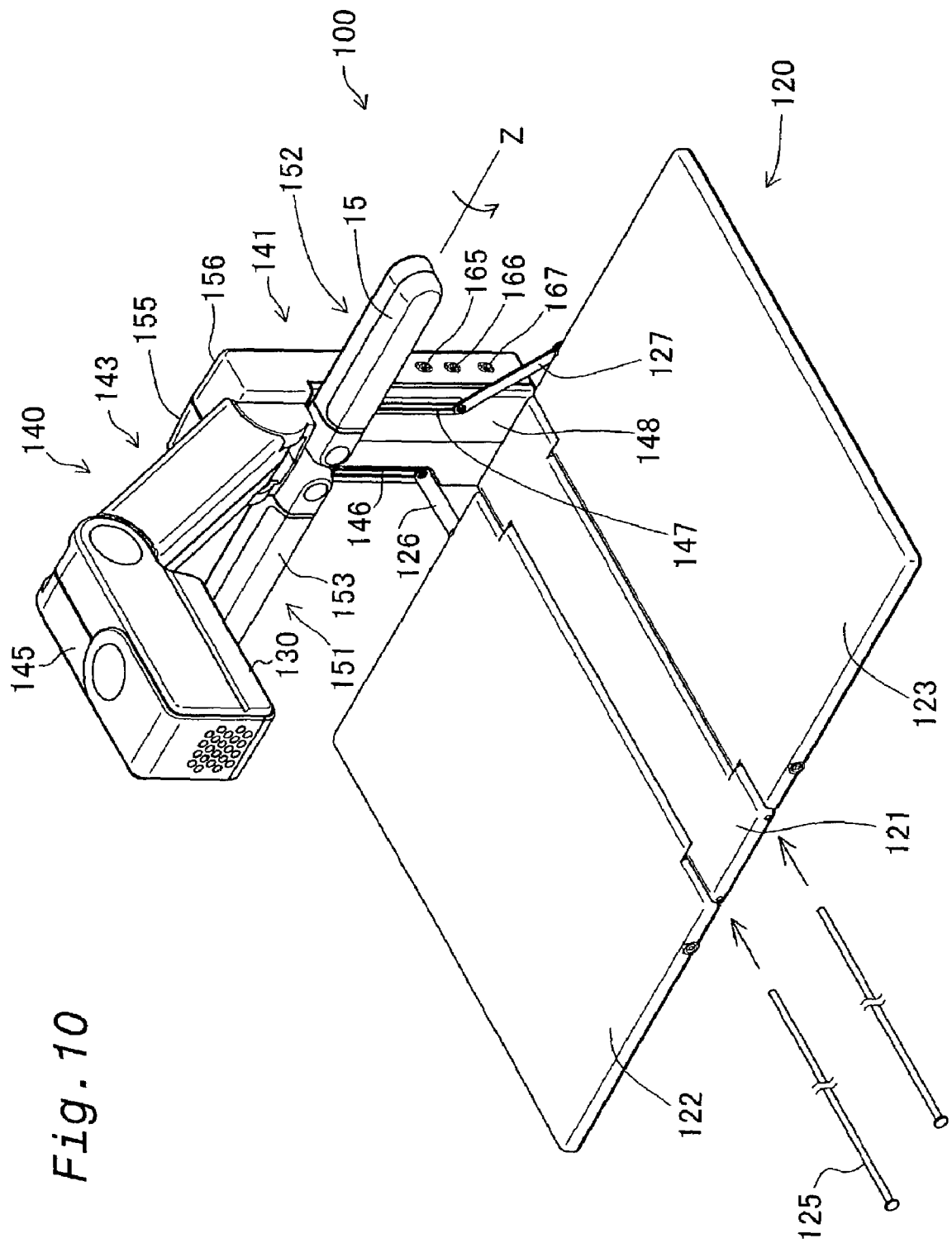
FIG. 10 is a perspective view schematically illustrating the structure of a camera-assisted presentation apparatus in a service state as a first embodiment of the present invention.
Figure 11:
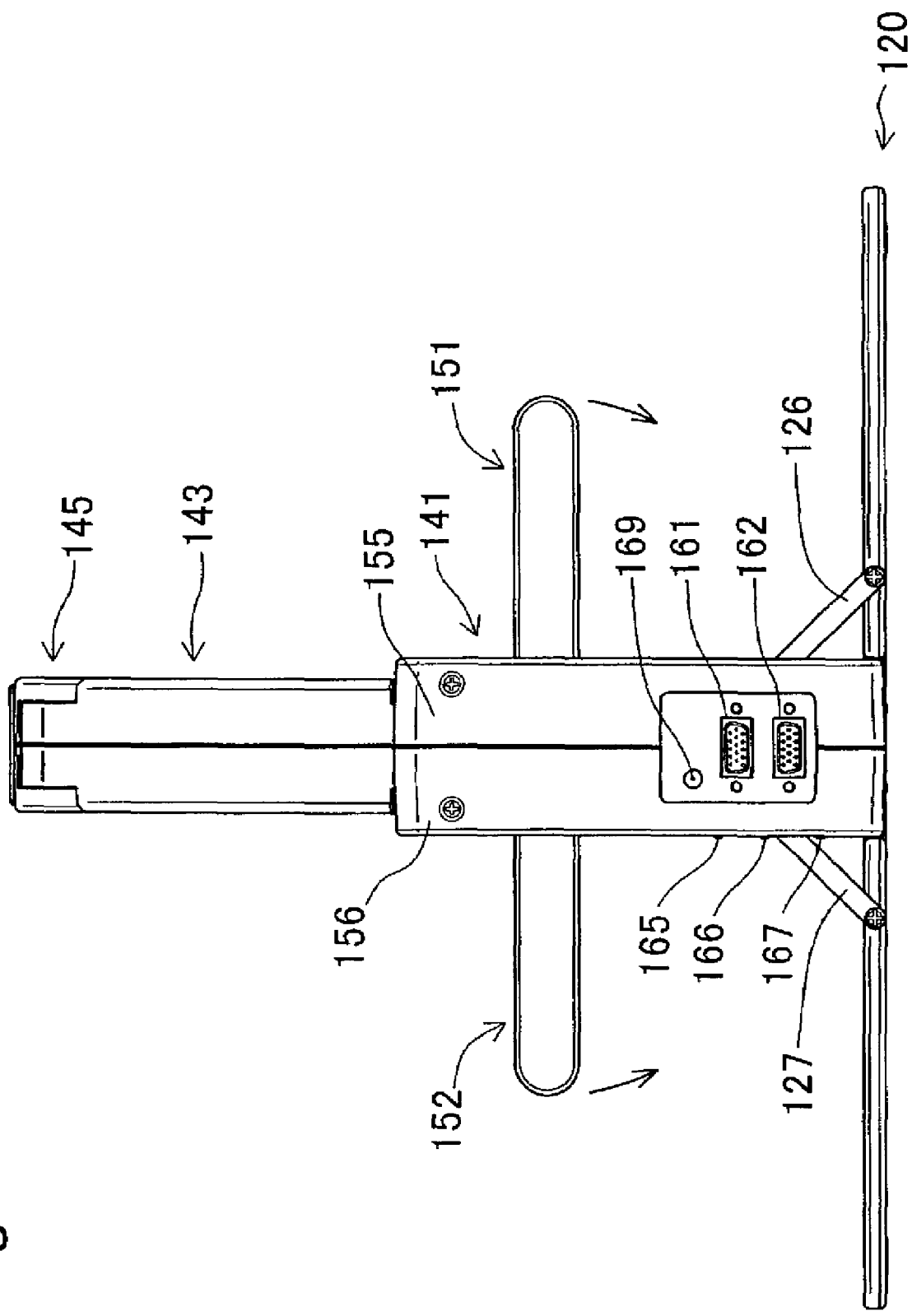
FIG. 11 is a rear view illustrating a rear face of the camera-assisted presentation apparatus in the service state.

The following describes some embodiments of the imaging apparatus according to the respective modes of carrying out the present invention discussed above. FIG. 10 is a perspective view schematically illustrating the structure of a camera-assisted presentation apparatus 100 in a service state as a first embodiment of the present invention. FIG. 11 is a rear view of the camera-assisted presentation apparatus 100. As illustrated, the camera-assisted presentation apparatus 100 includes a table 120 having a greater area than the paper size of A4 and a camera support assembly 140 with a video camera 130 attached to an end thereof.

The table 120 includes a fixation member 121 fixed to a lower end of the camera support assembly 140, and two extension members 122 and 123 supported on either side of the fixation member 121 in a pivotally rotatable manner. The fixation member 121 and the extension members 122 and 123 are thin plates of a synthetic resin and have reinforcing metal plates fixed to the respective rear faces thereof (see the mechanism of FIG. 5). The fixation member 121 has concaves of a predetermined width formed on both sides to receive convexes of the extension members 122 and 123. Each fitting has a through hole to receive a shaft 125 inserted therein, so that the extension members 122 and 123 are rotatable relative to the fixation member 121.

The two extension members 122 and 123 are provided with joint bars 126 and 127 on the side of the camera support assembly 140 to control the position of extension. The joint bars 126 and 127 are screwed to the respective ends of the extension members 122 and 123 in a pivotally rotatable manner. The function of the joint bars 126 and 127 will be discussed after description of the structure of the camera support assembly 140.

The camera support assembly 140 includes a base member 141 linked with the fixation member 121, an arm member 143 coupled with the base member 141 in a pivotally rotatable manner, and a camera holder member 145 that is coupled with the arm member 143 in a pivotally rotatable manner and holds the video camera 130 attached thereto. The base member 141 has a linkage member 148 mechanically linked with the fixation member 121. An electronic circuit (discussed later) is mounted on the linkage member 148. The linkage member 148 has two vertical grooves 146 and 147 on the left and the right ends thereof facing the table 120. Link elements of the joint bars 126 and 127 are fitted in these grooves 146 and 147.

As shown in FIG. 10, illumination lamps 151 and 152, which are rotated to a horizontal position and lighted in the service state, are attached to the linkage member 148. The illumination lamps 151 and 152 respectively include multiple light emitting diodes and have white dispersive covers 153 and 154, which disperse the highly directional light of the light emitting diodes. The lamp section of each lamp 151 or 152 with the cover 153 or 154 is slightly rotatable relative to its base section about an axis Z. In the service state of the camera-assisted presentation apparatus 100, the illumination lamps 151 and 152 are manually rotated relative to the table 120 to regulate the lighting direction. The illumination lamps 151 and 152 are rotatably attached to the linkage member 148 and are rotated to a specific position along the vertical axis of the linkage member 148 for storage (see FIG. 15).

The linkage member 148 has a pair of splitting outer cases 155 and 156, which are detachably attached. The outer cases 155 and 156 are provided with an input connector 161 and an output connector 162 (see FIG. 11) for input and output of image signals, as well as three switches 165 through 167. The input connector 161 is located above the output connector 162. In the service state of the camera-assisted presentation apparatus 100, a signal cable is connected to the output connector 162, while no signal cable may be connected to the input connector 161. A power connector 169 is disposed above the input connector 161 to connect with an external power source unit 220 (see FIG. 12).

The three switches provided on the side face of the outer case 156 of the base member 141 are a power switch 165 for turning on and off the power supply of the camera-assisted presentation apparatus 100, a lamp switch 166 for tuning on and off the illumination lamps 151 and 152, and a select switch 167 for selecting an image signal. The select switch 167 selects either an image signal from the video camera 130 of the camera-assisted presentation apparatus 100 or an image signal received by the input connector 161 to be output to the output connector 162.

Figure 12:
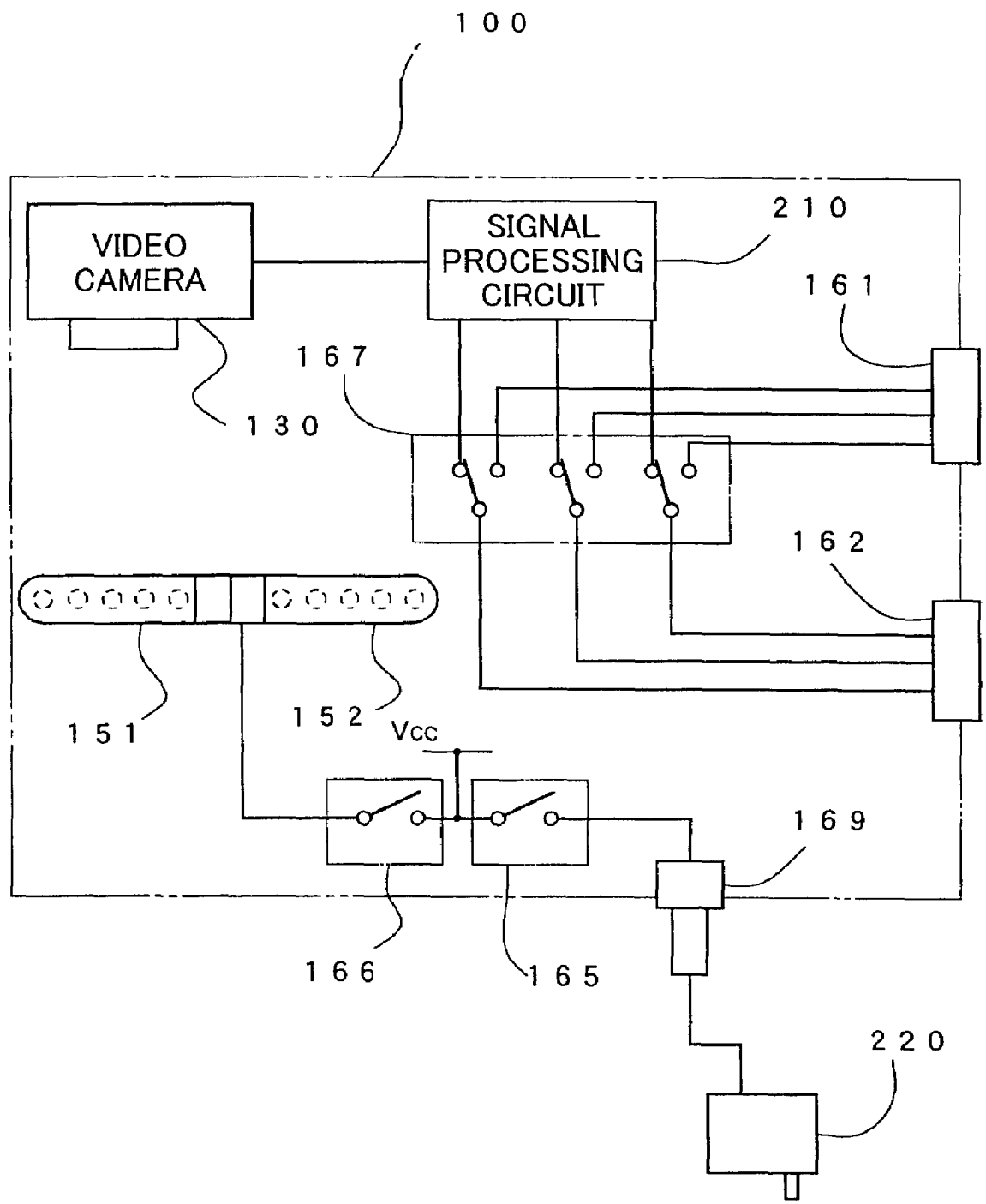
FIG. 12 shows the electric circuit structure of the camera-assisted presentation apparatus.

The electrical construction of the camera-assisted presentation apparatus 100 with these switches is described. As shown in FIG. 12, the camera-assisted presentation apparatus 100 includes a signal processing circuit 210 that processes an image signal from the video camera 130 and outputs the processed signal as an RGB signal. The signals from the signal processing circuit 210 are connected to one group of selectable contacts in the select switch 167. The signals from the input connector 161 are connected to the other group of selectable contacts in the select switch 167. Common contacts of the select switch 167 are connected to the output connector 162. In response to an operation of the select switch 167, either of the image signal from the signal processing circuit 210 or the image signal received by the input connector 161 is selectively output to the output connector 162.

A power line is laid in the camera-assisted presentation apparatus 100 to supply a power source Vcc, which is fed from the power source unit 220 through the power connector 169, via the power switch 165. The lamp switch 166 linked with the two illumination lamps 151 and 152 is connected to the power line. While the power source unit 220 is connected with the power connector 169, the camera-assisted presentation apparatus 100 is driven only in response to an ON operation of the power switch 165. When the power switch 165 is turned ON, the image signal selected by the select switch 167 (the image signal from the signal processing circuit 210 in the ordinary state, for example, the image signal from the video camera 130) is output to the output connector 162. An ON operation of the lamp switch 166 lights up the illumination lamps 151 and 152.

Figure 13:
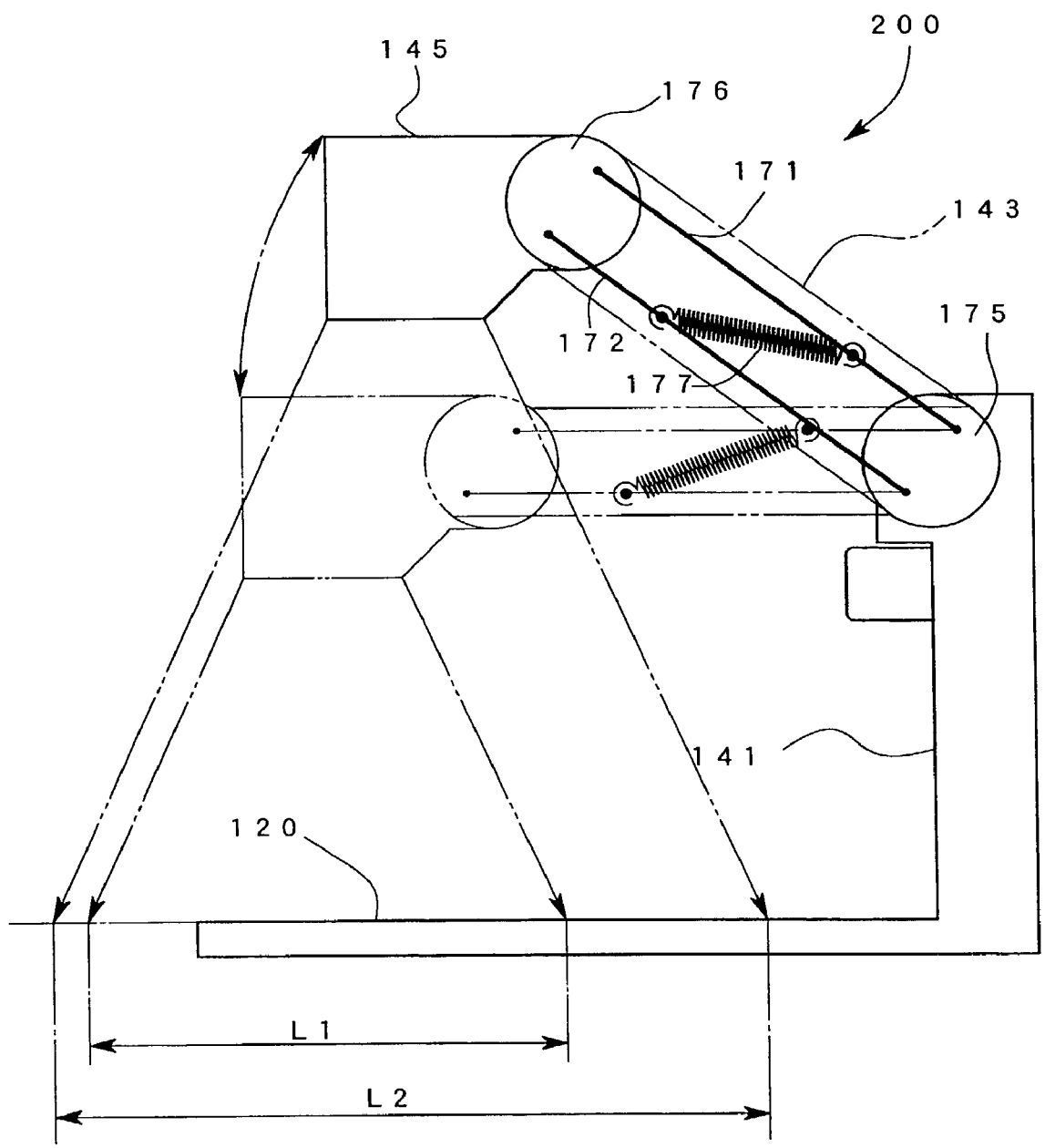
FIG. 13 shows the structure of a link mechanism in the camera-assisted presentation apparatus.

A circular support element 175, which works as part of a link mechanism 200 discussed later, is built in the upper portion of the base member 141 and is coupled with the arm member 143. As shown in FIG. 13, the arm member 143 includes two link elements 171 and 172, which are attached to the support element 175 of the base member 141 and a support element 176 of the camera holder member 145 in a rotatable manner. While the support element 175 is fixed to the base member 141, the support element 176 is rotatably supported on a shaft (not shown) of the arm member 143. The camera holder member 145 is fixed to the support element 176. A coil spring 177 is spanned between the two link elements 171 and 172. The coil sprint 177 functions to decrease a load applied in the process of manually shifting the camera holder member 145.

In response to a manual movement of the camera holder member 145, the link mechanism 200 works to hold the attitude of the camera holder member 145 and thereby the attitude of the video camera 130. A downward movement of the camera holder member 145 from the service position shown in FIGS. 10 and 13 causes the two link elements 171 and 172 to rotate about the respective attachment positions on the support element 175. The other attachment positions of the link elements 171 and 172 (that is, the attachment positions on the support element 176) keep their relative positional relationship. This is based on the following principle. In a parallelogram defined by the link elements 171 and 172 and the support elements 175 and 176, when one side is fixed and the other three sides are moved, the side facing the fixed side keeps the parallel orientation to the fixed side. The attitude of the camera holder member 145 fixed to the support element 176 is accordingly kept during the movement. The absolute position of the support element 176 is naturally changed with the movement of the camera holder member 145, and the arm member 143 is moved accordingly. The support element 176 thus rotates clockwise relative to the shaft of the arm member 143.

Figure 14:
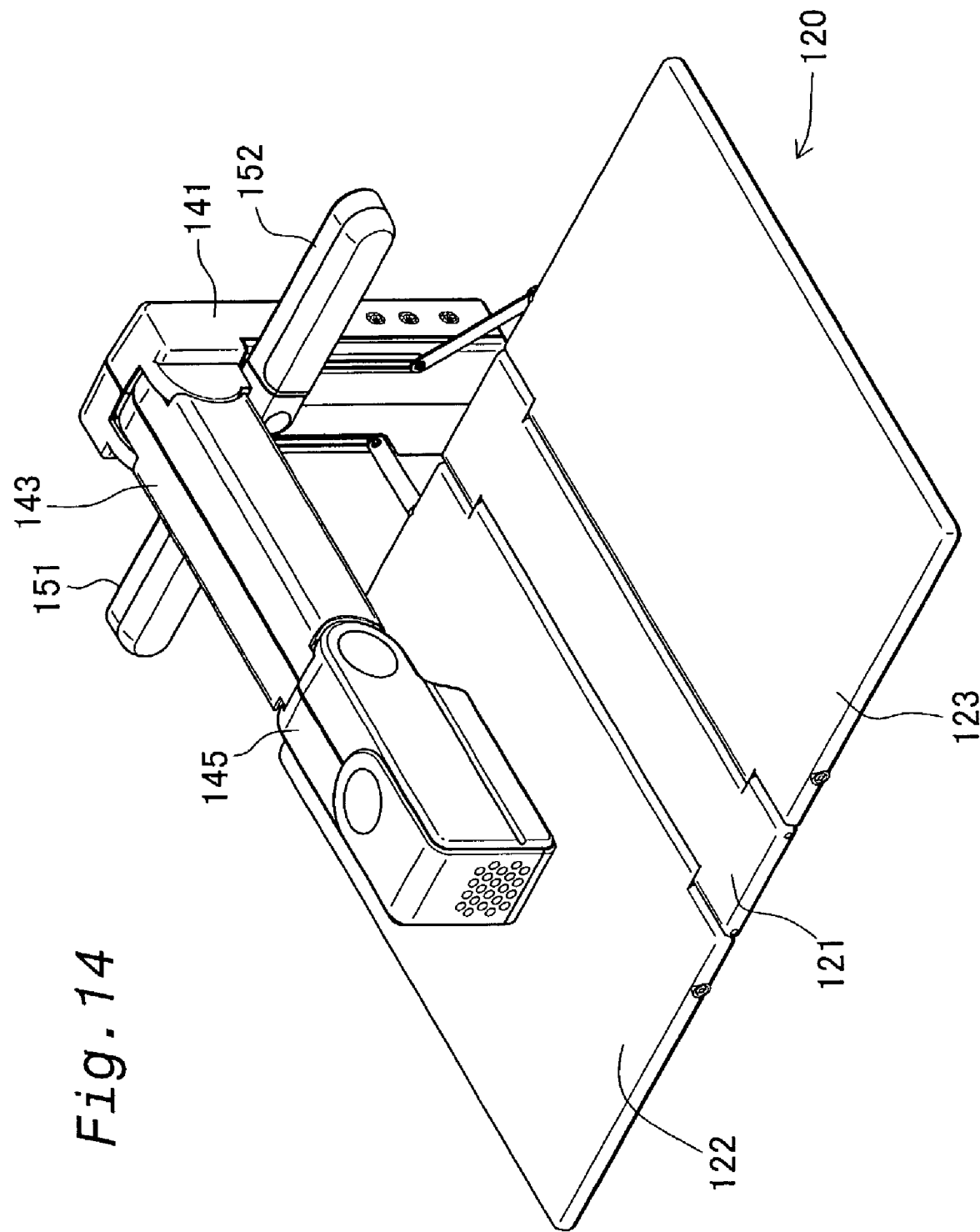
FIG. 14 is a perspective view illustrating the camera-assisted presentation apparatus in which a camera holder member is pressed down.

FIG. 14 shows the state in which the camera holder member 145 is shifted to the lower most position. In this state, the arm member 143 and the camera holder member 146 are substantially aligned, whereas the arm member 143 is substantially perpendicular to the base member 141. In this embodiment, the video camera 130 uses a monofocal lens and thus ensures clear imaging of a material on the table 120 even at the lower most position shown in FIG. 14. Compared with the position shown in FIG. 10, the video camera 130 has a smaller imaging range at the lower most position shown in FIG. 14. The difference in positional relation of the video camera 130 to the table 120 varies the imaging range from L2 to L1 as schematically shown in FIG. 13. The variation in imaging range of the video camera 130 with the monofocal lens leads to expansion and contraction of the imaging range.

The camera-assisted presentation apparatus 100 of this embodiment has only one link mechanism 200. One modified structure may have two link mechanisms coupled with each other to form a V-shaped arm member 143. In this structure, the movement of the camera holder member 145 in the horizontal direction accompanied with its vertical movement is freely adjustable. For example, the movement in the horizontal direction may be set equal to zero.

Figure 15:
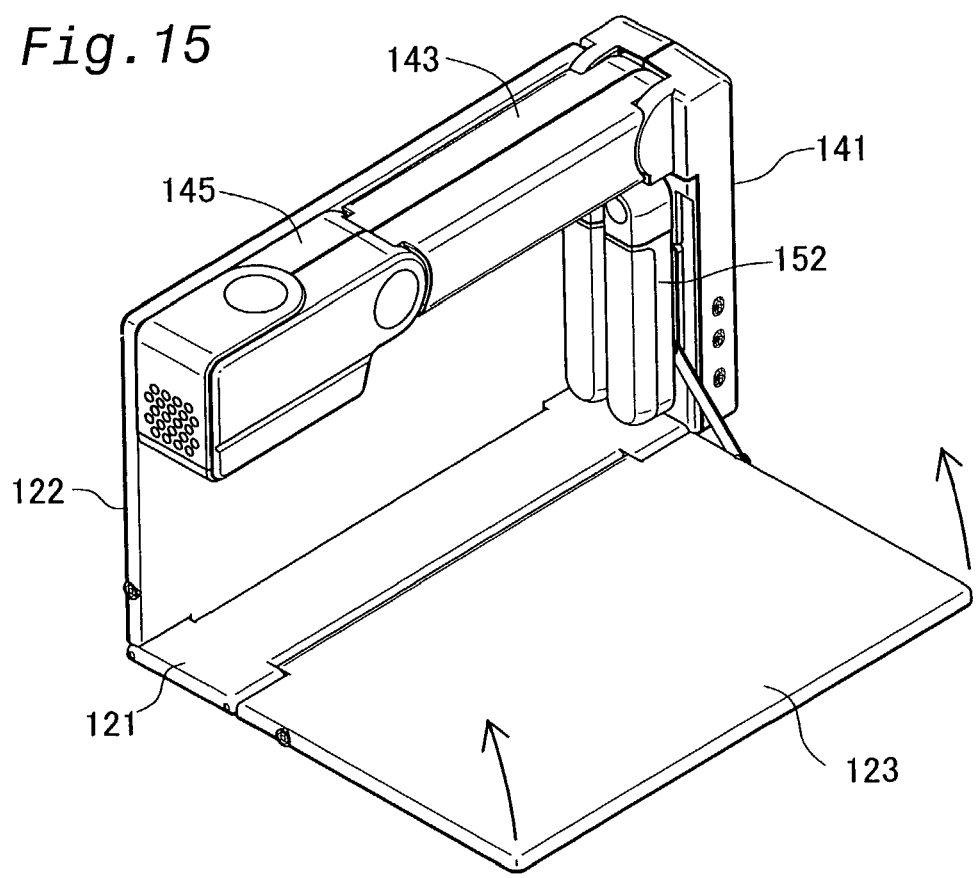
FIG. 15 is a perspective view illustrating the camera-assisted presentation apparatus in which one extension member is folded down.
Figure 16:
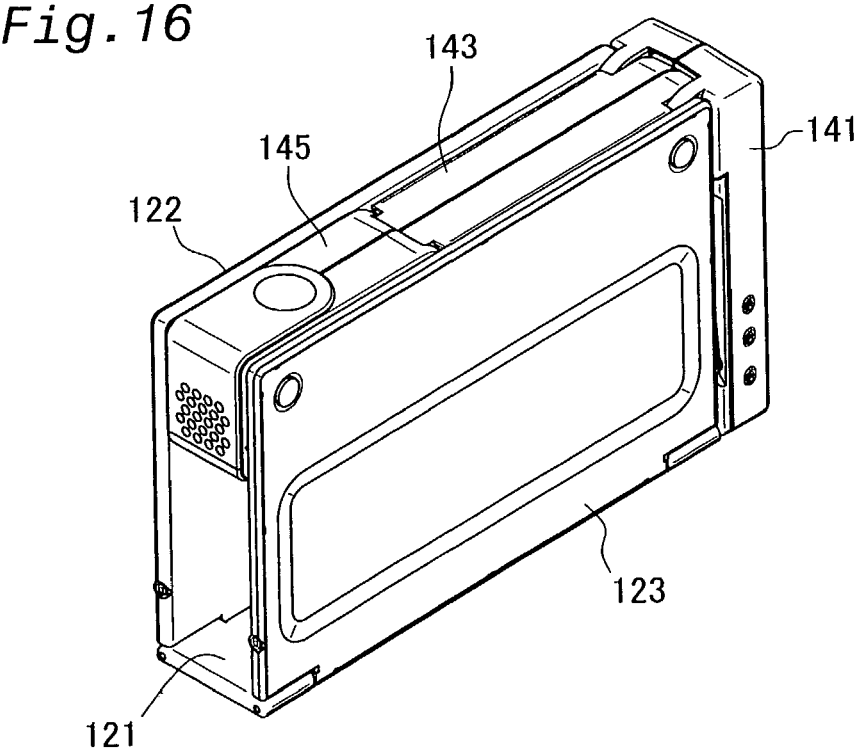
FIG. 16 is a perspective view illustrating the camera-assisted presentation apparatus in a non-service state for storage.

The closest position of the camera holder member 145 to the table 120 shown in FIG. 14 is a storage position of the camera-assisted presentation apparatus 100. The following describes storage of the camera-assisted presentation apparatus 100. In the case of storage of the camera-assisted presentation apparatus 100, the camera holder member 145 is first moved to the lower most position, that is, the closest position to the table 120 as shown in FIG. 14. The illumination lamps 151 and 152 are rotated about the axis Z to attain a substantially horizontal lighting direction and are further rotated to make its longitudinal direction along the longitudinal direction of the base member 141. In this state, the extension member 122 of the table 120 is lifted up to the substantially vertical orientation. The side of the extension member 122 opposite to the side coupled with the fixation member 121 is practically located in a plane defined by the upper faces of the arm member 143 and the camera holder member 145 as shown in FIG. 15. The other extension member 123 is lifted up in a similar manner to the substantially vertical orientation. Like the extension member 122, the side of the extension member 123 opposite to the side coupled with the fixation member 121 is practically located in the plane defined by the upper faces of the arm member 143 and the camera holder member 145. FIG. 16 shows the resulting storage state. In the process of rotating the extension members 122 and 123 from its extended state (FIG. 10) to the storage state (FIG. 16), the respective one ends of the joint bars 126 and 127 slide upward in the grooves 146 and 147. The upper and the lower ends of the grooves 146 and 147 are formed slightly deeper. The ends of the joint bars 126 and 127 are accordingly fitted in the deeper ends of the grooves 146 and 147 to attain some locking function. No specific mechanism is required to release this locking. In the storage state where the two extension members 122 and 123 are set in the vertical orientation, the locking holds the extension members 122 and 123 to prevent undesirable extension of the extension members 122 and 123 due to their own weight.

The camera-assisted presentation apparatus 100 of the embodiment in the storage state forms the shape of a quasi rectangular solid having an area less than half the area of the table 120 and a width slightly greater than the width of the base member 141 (the width greater by twice the thickness of the table 120). The space of the camera-assisted presentation apparatus 100 required for storage is thus significantly smaller than the space required in its service state. This arrangement of the embodiment desirably reduces the total size of the camera-assisted presentation apparatus for storage and significantly enhances its portability. In the service state, the two extension members 122 and 123 are extended to the horizontal orientation, and the camera holder member 145 is pulled up. This simple action makes the camera-assisted presentation apparatus 100 stand by for service. In the service state, the table 120 has a sufficiently wide area on which the material is mounted. When the width of the power source unit 220 is approximately the same as the width of the base member 141, the power source unit 220 can be accommodated in the internal space defined by the extension members 122 and 123 and the base member 141 in the storage state.

In the camera-assisted presentation apparatus 100 of the embodiment, the table 120, on which the material is mounted, has a white surface made of a synthetic resin. The table 120 of the embodiment has a size greater than the paper size of A4 to hold a material up to a size A3 mounted thereon. This structure effectively prevents stains on the surface of a table or a desk, on which the camera-assisted presentation apparatus 100 is placed, from being displayed, for example, on a monitor television connected to the camera-assisted presentation apparatus 100, while no material is mounted on the table 120. The rectangular table 120 facilitates positioning of the material at the right position and right angle relative to the video camera 130. In the embodiment discussed above, the table 120 is simply used to hold the material mounted thereon. A lighting unit may be built in the table to enable presentation of transparent materials. Another possible modification may incorporate a thin film speaker in the table 120 or incorporate a unit for utilizing static electricity to adsorb and fix the material in the table 120. The table may have an auxiliary support member used when the material to be imaged is larger than the size of the table. This is described below as a second embodiment of the present invention.

Figure 17:
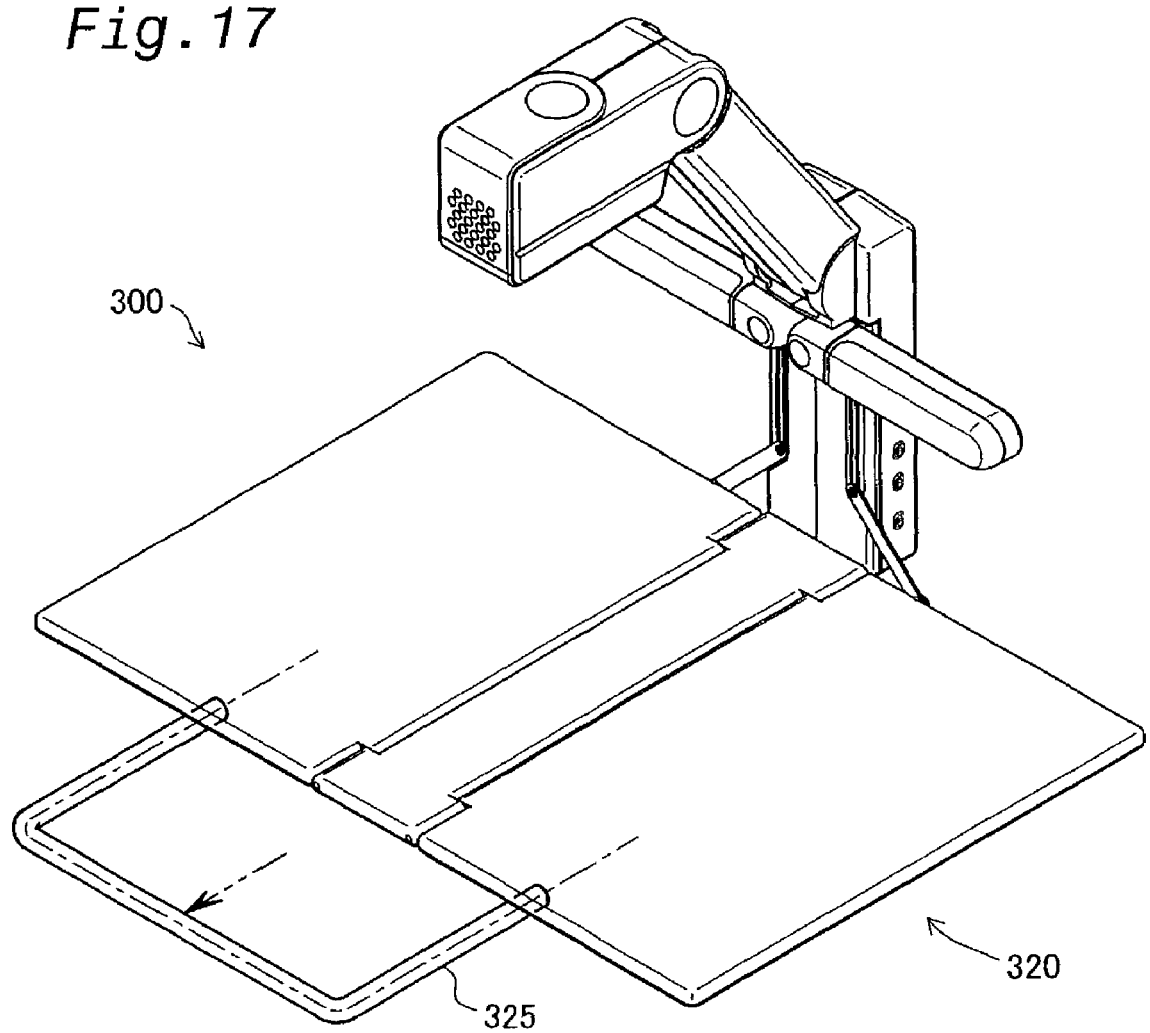
FIG. 17 is a perspective view schematically illustrating the structure of a camera-assisted presentation apparatus in a second embodiment of the present invention.
Figure 18:
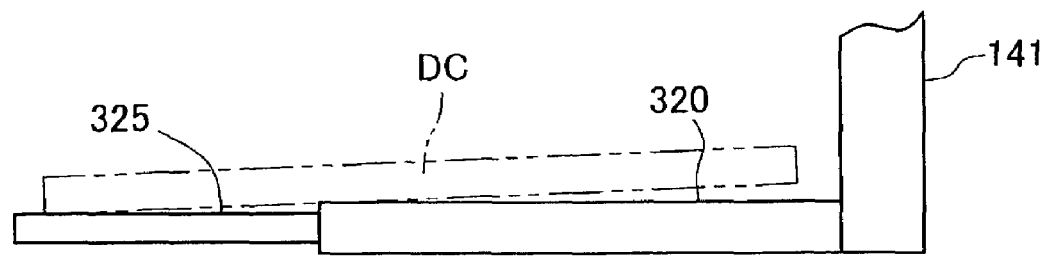
FIG. 18 shows an auxiliary support member drawn out of a table to support a material protruding over the table.
Figure 19:
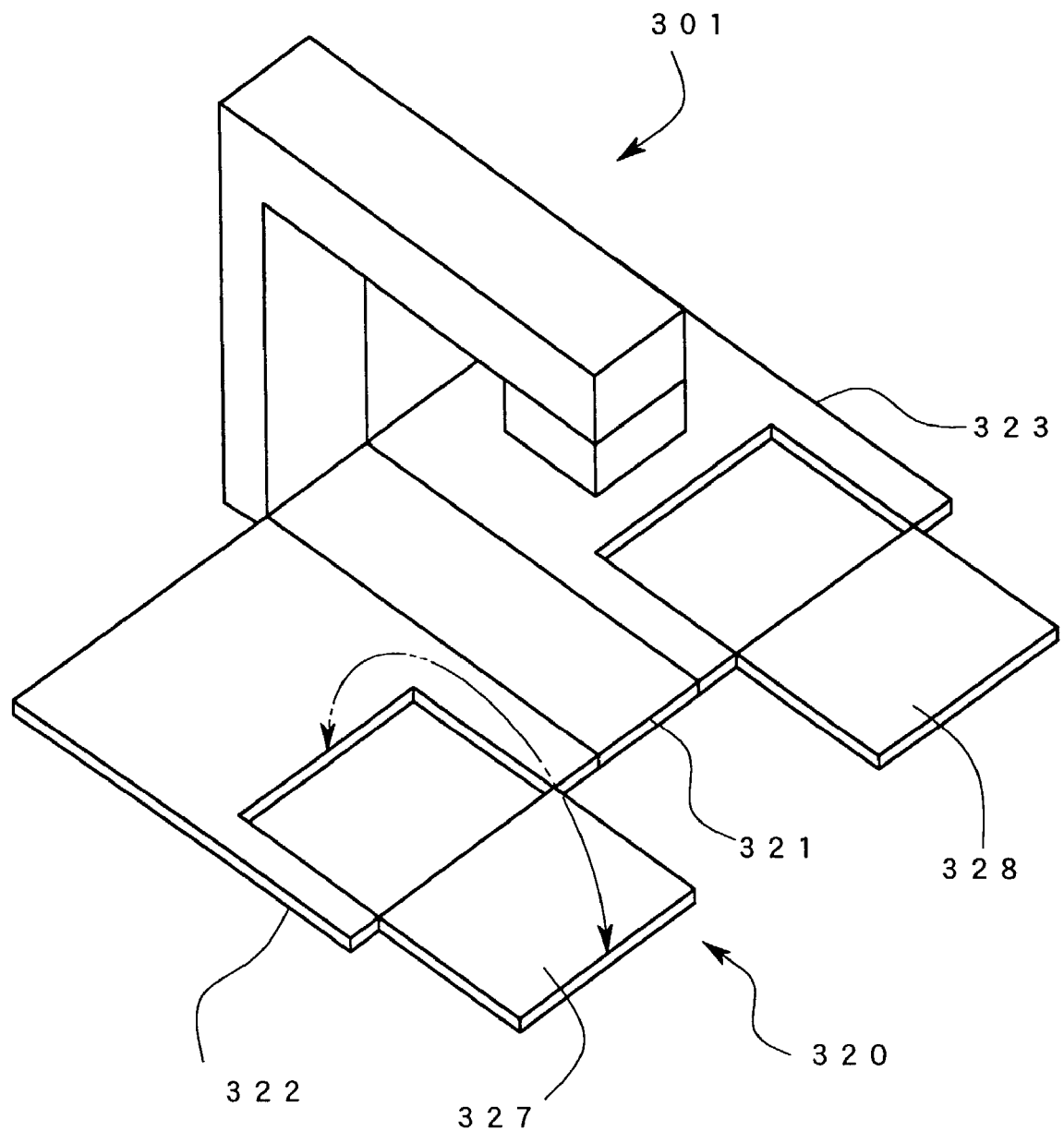
FIG. 19 shows another auxiliary support member applicable in the camera-assisted presentation apparatus of the second embodiment.

A camera-assisted presentation apparatus 300 in the second embodiment of the present invention shown in FIG. 17 has similar structure to that of the camera-assisted presentation apparatus 100 of the first embodiment. The primary difference is that the camera-assisted presentation apparatus 300 has an auxiliary support member 325 received in a table 320 in a drawable manner. The auxiliary support member 325 is generally held in the table 320 and is drawn out of the table 320 to hold a large material protruding over the table 320. The auxiliary support member 325 prevents inclination of the large material placed on the table 320 as shown in FIG. 18. In the camera-assisted presentation apparatus 300 of the second embodiment shown in FIG. 17, the auxiliary support member 325 is generally held inside the table 320 and is drawn out for use. In another camera-assisted presentation apparatus 301 shown in FIG. 19, a pair of auxiliary support members 327 and 328 are rotatably attached to the ends of extension members 322 and 323, and are rotated to be extended and hold a large material. The auxiliary support members may be separate members and attached to a fixation member 321 or the extension members 322 and 323 for use.

Figure 20:
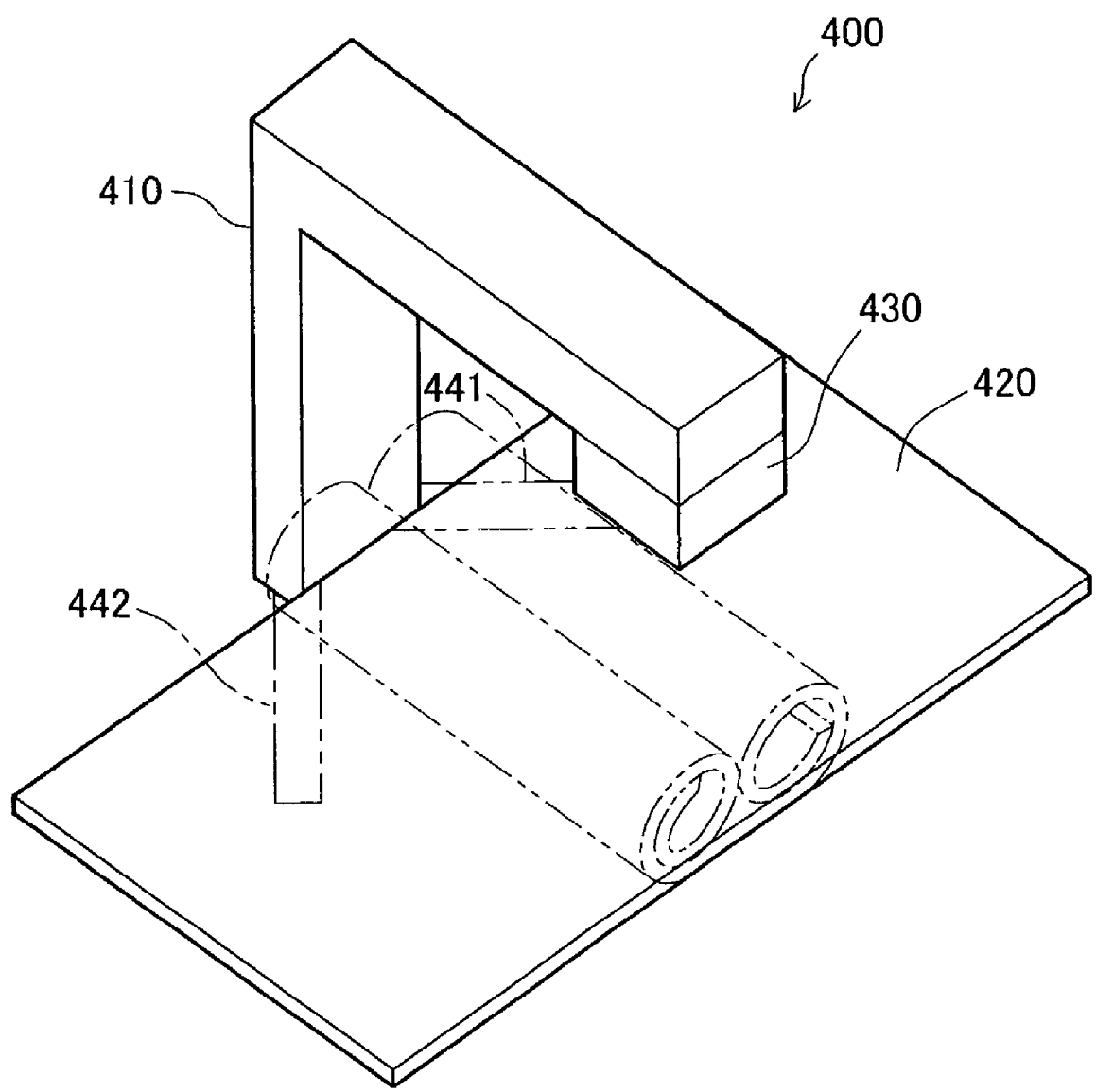
FIG. 20 is a perspective view schematically illustrating the structure of a camera-assisted presentation apparatus in a third embodiment of the present invention.

FIG. 20 shows another camera-assisted presentation apparatus 400 in a third embodiment of the present invention. The camera-assisted presentation apparatus 400 includes a self-sustained video camera stand 410 and a roll-up table 420. The self-sustained video camera stand 410 has two legs 441 and 442 extended from the bottom thereof at substantially right angles, and holds a video camera 430 attached to one end thereof. The table 420 is composed of a white, thick flexible material. The approximate center of the longitudinal side of the table 420 is bonded to the base of the video camera stand 410. The table 420 is rolled up for storage as shown by the two-dot chain line and is extended in the service state as shown by the solid line in FIG. 20.

In the camera-assisted presentation apparatus 400 of this structure, the table 420 having a wide area is rolled up for storage. This arrangement advantageously reduces the total size of the camera-assisted presentation apparatus 400 in the non-service state and enhances its portability. In many cases, the table is used simply as a rough standard to position the material for imaging. The table 420 is composed of a flexible material, such as a synthetic resin, and is rolled up for storage and is extended in the service state as the rough standard to position the material for imaging. In the structure of this embodiment, the table 420 is made of one sheet and has no joints. The sheet may be formed in a bag shape to keep materials for imaging and default images, one of which is displayed when no material is mounted on the table. The material applicable for the sheet is not restricted to the synthetic resin, but may be a thin metal plate like a thin stainless steel plate, cloth, or skin. The sheet may consist of a large number of fine tubular or cylindrical elements, which are rolled up like a rolling blind for storage.

Figure 21:
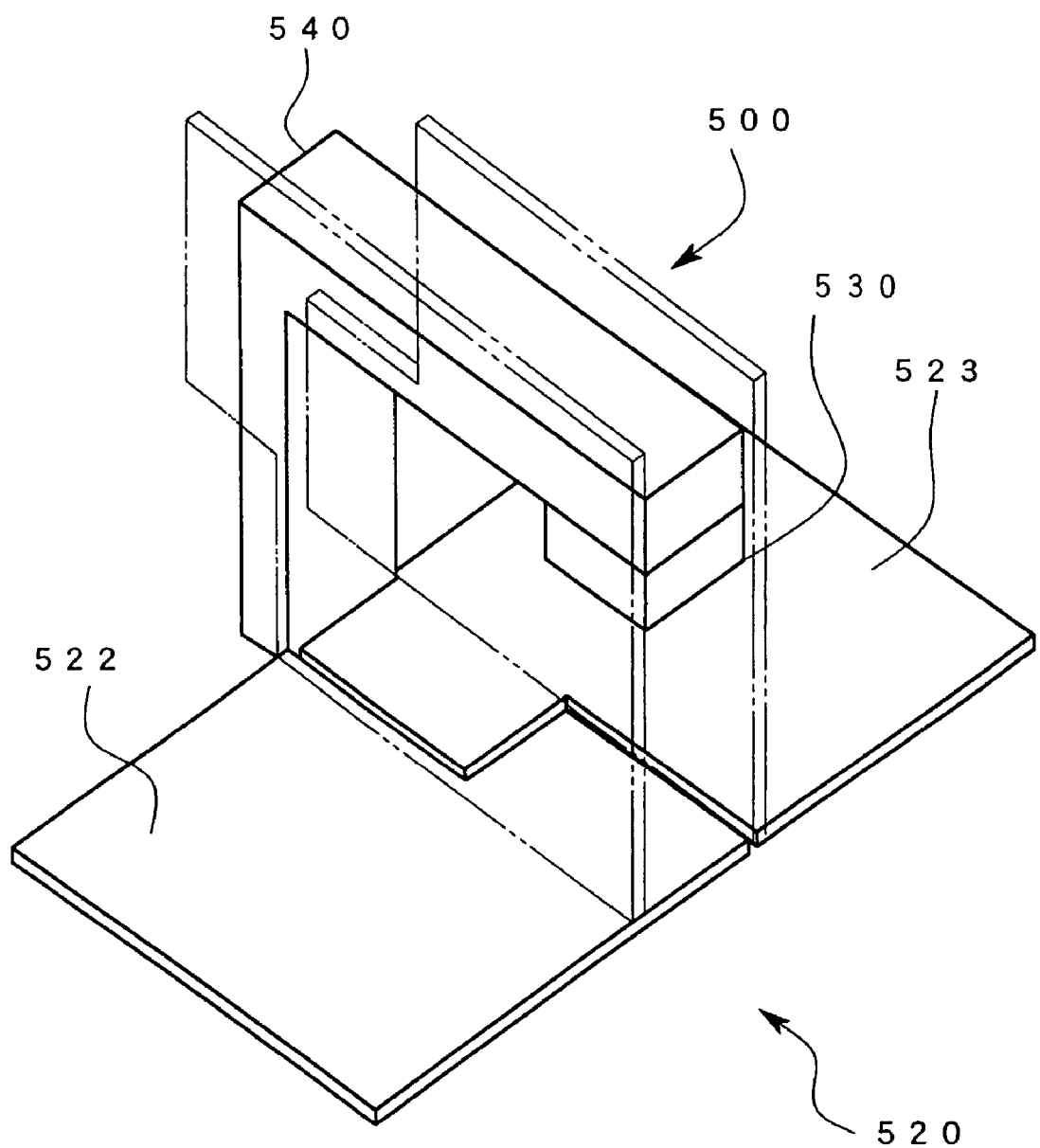
FIG. 21 is a perspective view schematically illustrating the structure of another camera-assisted presentation apparatus in a modified example.

The above embodiments and their modifications are to be considered in all aspects as illustrative and not restrictive. There may be many modifications, changes, and alterations without departing from the scope or spirit of the main characteristics of the present invention. The technique of the present invention is not restricted to the camera-assisted presentation apparatus but may be applicable to any imaging apparatus, such as a projector. The video camera may be provided with a zoom lens, instead of the monofocal lens. In the embodiments discussed above, the table is folded down or rolled up in one direction. The table may be folded down in two different directions, for example, folded in four. Another possible modification has an extension member slidably extended from a base member to form a table of a wide area. In another camera-assisted presentation apparatus 500 schematically illustrated in FIG. 21, a video camera stand 540 for holding a video camera 530 attached thereto is self sustained, and two extension members 522 and 523 are attached to the both sides of the video camera stand 540 by means of universal joints (not shown). The extension members 522 and 523 are laid to form a table 520 in the service state and are rotated about the respective joints to the vertical orientation for storage. This arrangement enables the shape of the extension members 522 and 523 of the table 520 to be freely designed (for example, a combination of curved extension members), while reducing the total size of the camera-assisted presentation apparatus 500.

In the above embodiment, LEDs (light emitting diodes) may be arranged in the vicinity of the video camera 130 to project a pointer on the upper face of the table 120 and define an imaging range, for example, the size of A4. The LEDs for projecting the pointer may be built in the illumination lamps 151 and 152.

Figure 22:
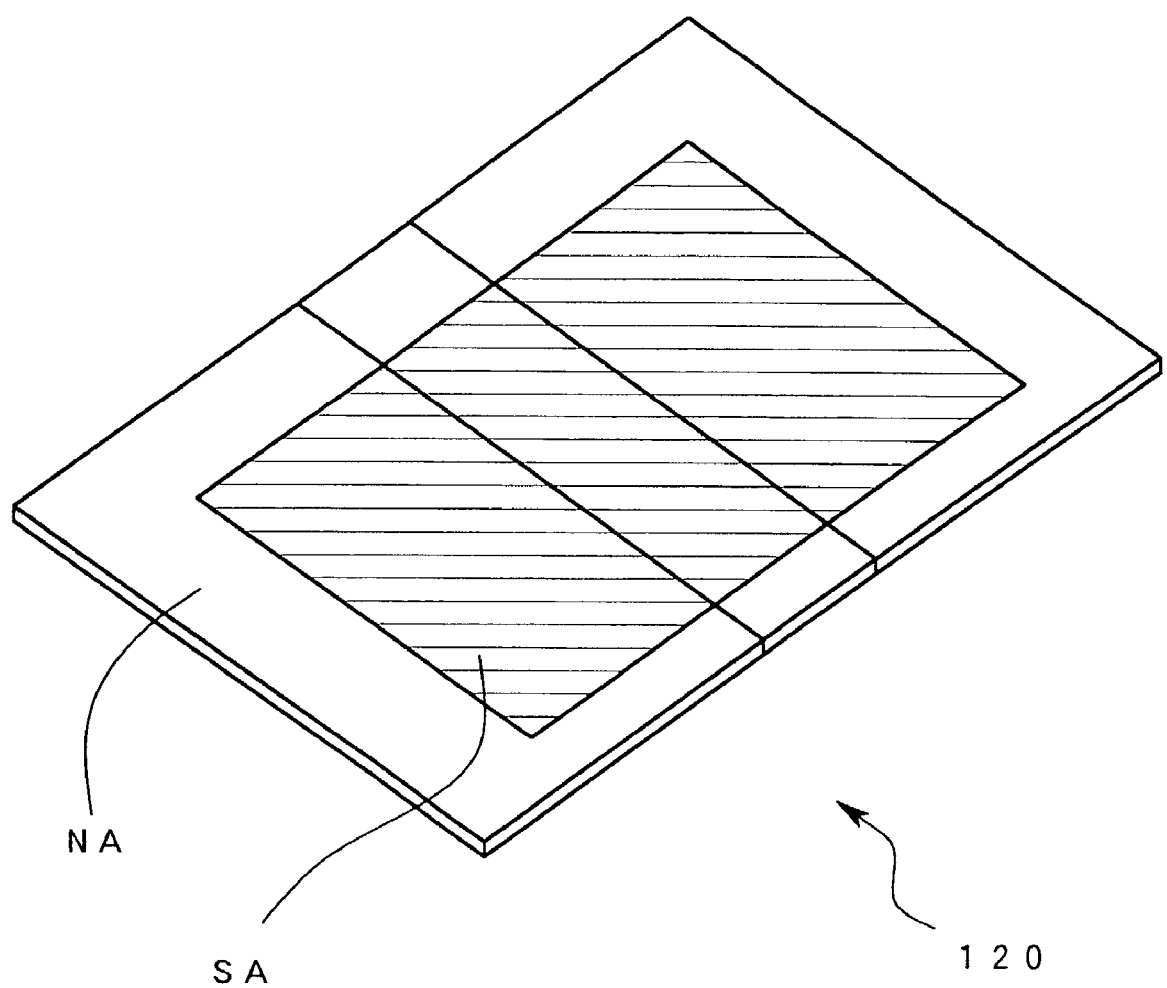
FIG. 22 shows another structure applicable for the table.

In another modified example shown in FIG. 22, part of the table 120 is embossed to define the imaging range of the video camera 130. Embossing roughs the surface of the fixation member 121 and the extension members 122 and 123 of the table 120. The embossed area, for example, fluffed area is visually distinguishable from the residual non-embossed area from a cross angle. In the example of FIG. 22, an embossed area SA has a shade due to the surface treatment when seen from the cross angle, and is thus visually distinguishable from a non-embossed area NA. This arrangement facilitates accurate positioning of the material along the embossed area SA. The embossed area SA is, on the other hand, indistinguishable from the residual non-embossed area NA from the overhead video camera 130. The displayed image of the table 120 without the material on the monitor television accordingly does not give any feeling of oddness.

The whole area SA may be subjected to embossing, or only a predetermined width in the area SA along its contour may be subjected to embossing. Embossing may also be carried out to show an area of another paper size, for example, B5, a US letter size, or a legal size. Any suitable processing other than embossing may be applied for surface treatment of the table 120 to make a specific area distinguishable from a cross angle but substantially indistinguishable from a right overhead position. One example of such processing changes the surface roughness in the specific area from that of the residual area.

In the camera-assisted presentation apparatus of the above embodiment, the foldable table 120 is surface treated. Such surface treatment is not restricted to the camera-assisted presentation apparatus of the above structure but is applicable to any camera-assisted presentation apparatus with a table on which a material is mounted, as well as other imaging apparatuses.

The scope and spirit of the present invention are indicated by the appended claims, rather than by the foregoing description.

What is claimed is:

1. An imaging apparatus comprising:
   a table, on which an object to be imaged is mounted;
   a video camera that faces said table in an imaging direction; and
   a video camera support member that is connected with the table and holds said video camera, which is attached to one end of said video camera support member, at a specific fixed position with respect to said table for imaging said table,
   wherein said table is foldable so as to occupy a smaller space and define a non-service state of said imaging apparatus than a space in a service state of said imaging apparatus with said table unfolded, while keeping the connection with the video camera support member in both said states;
   wherein said table comprises at least two members, and said at least two members are folded in the non-service state of said imaging apparatus; and wherein said table comprises a fixation member having a substantially equal width to a width of said video camera support member, and two extension members attached to either side of said fixation member in a pivotally rotatable manner, said video camera support member is fixed to one end of said fixation member, said two extension members are folded toward said video camera support member in the non-service state of said imaging apparatus, and said two extension members are pivotally rotated to a specific position to be combined with said fixation member and form an identical plane in the service state of said imaging apparatus.

2. An imaging apparatus in accordance with claim 1, wherein said table comprises at least two members, and said at least two members are folded down in the non-service state of said imaging apparatus.

3. An imaging apparatus in accordance with claim 2, wherein said at least two members include two members that have a substantially identical area and are arranged to overlap each other in storage of said imaging apparatus.

4. An imaging apparatus in accordance with claim 1, wherein said video camera has a zoom function to expand an imaging range.

5. An imaging apparatus in accordance with claim 4, wherein said video camera is a CCD camera with a monofocal lens, and said video camera support member comprises a position change member that changes over a position of said video camera relative to said table between at least two different options.

6. An imaging apparatus in accordance with claim 5, wherein said video camera support member comprises at least two members, one member being a camera fixation member to fix said video camera, the other member being a movable member coupled with said camera fixation member and moved to vary a distance between said video camera and said table.

7. An imaging apparatus in accordance with claim 6, wherein said movable member pivotally rotates about a predetermined position in a neighborhood of said table.

8. An imaging apparatus in accordance with claim 7, wherein said movable member is attached to a post of a preset width extended upright from one end of said table in a pivotally rotatable manner.

9. An imaging apparatus in accordance with claim 6, said imaging apparatus further comprising:

two link mechanisms arranged substantially parallel to each other are disposed between said movable member and said camera fixation member, which are coupled with each other, in order to hold an attitude of said video camera fixed to said camera fixation member relative to said table while said movable member rotates.

10. An imaging apparatus in accordance with claim 7, said imaging apparatus further comprising:

two link mechanisms arranged substantially parallel to each other are disposed between said movable member and said camera fixation member, which are coupled with each other, in order to hold an attitude of said video camera fixed to said camera fixation member relative to said table while said movable member rotates.

11. An imaging apparatus in accordance with claim 8, said imaging apparatus further comprising:

two link mechanisms arranged substantially parallel to each other are disposed between said movable member and said camera fixation member, which are coupled with each other, in order to hold an attitude of said video camera fixed to said camera fixation member relative to said table while said movable member rotates.

12. An imaging apparatus in accordance with claim 8, said imaging apparatus further comprising:

a lighting module that illuminates said table, said lighting module being attached to said post in a pivotally rotatable manner, being folded down to a first position overlapping said post in the non-service state of said imaging apparatus, and being rotated to a second position crossing over said post in the service state of said imaging apparatus.

13. An imaging apparatus in accordance with claim 1, said imaging apparatus further comprising an attitude holding mechanism that holds an attitude of said video camera relative to said table while a distance between said video camera and said table is varied.

14. An imaging apparatus in accordance with claim 1, said imaging apparatus further comprising:

an output connector for outputting an image signal from said video camera.

15. An imaging apparatus in accordance with claim 14, said imaging apparatus further comprising:

an input connector for receiving an external image signal; and a selector that selects either one of the image signal from said video camera and the external image signal received by said input connector to be output to said output connector.

16. An imaging apparatus in accordance with claim 1, wherein said table has an auxiliary support member that is drawable from said table to support a material protruding over said table.

17. An imaging apparatus in accordance with claim 1, wherein said table is surface treated to have a specific surface area representing a place in which a material of a predetermined size is to be located.

18. An imaging apparatus in accordance with claim 1, wherein said extension members are each wider than said fixation member.

19. An imaging apparatus in accordance with claim 1, wherein said extension members are each wider than said fixation member.

20. An imaging apparatus comprising:

a table, on which an object to be imaged is mounted;

a video camera that faces said table in an imaging direction; and a video camera support member that is connected with the table and holds said video camera, which is attached to one end of said video camera support member, at a specific fixed position with respect to said table for imaging said table, wherein said table is foldable so as to occupy a smaller space and define a non-service state of said imaging apparatus than a space in a service state of said imaging apparatus with said table unfolded, while keeping the connection with the video camera support member in both said states; and wherein said table is composed of a flexible material, the flexible material being rolled up in the non-service state of said imaging apparatus and pulling out in the service state of said imaging apparatus to be extended to an imaging range of said video camera attached to the end of said video camera support member.

21. An imaging apparatus comprising:

a table, on which an object to be imaged is mounted;

a video camera that faces said table in an imaging direction; and a video camera support member that is connected with the table and holds said video camera, which is attached to one end of said video camera support member, at a specific fixed position with respect to said table for imaging said table, wherein said table is foldable so as to occupy a smaller space and define a non-service state of said imaging apparatus than a space in a service state of said imaging apparatus with said table unfolded, while keeping the connection with the video camera support member in both said states;

wherein said table comprises at least two members, and said at least two members are folded in the non-service state of said imaging apparatus;

wherein said at least two members include two members that have a substantially identical area and are arranged to overlap each other in storage of said imaging apparatus; and wherein said table comprises a fixation member having a substantially equal width to a width of said video camera support member, and two extension members attached to either side of said fixation member in a pivotally rotatable manner, said video camera support member is fixed to one end of said fixation member, said two extension members are folded toward said video camera support member in the non-service state of said imaging apparatus, and said two extension members are pivotally rotated to a specific position to be combined with said fixation member and form an identical plane in the service state of said imaging apparatus.

22. An imaging apparatus in accordance with claim 21, wherein said extension members are each wider than said fixation member.

* * * * *